US012055965B2

(12) United States Patent
Ogura

(10) Patent No.: US 12,055,965 B2
(45) Date of Patent: Aug. 6, 2024

(54) CONSTANT VOLTAGE CIRCUIT THAT SELECTS OPERATION MODES BASED ON OUTPUT VOLTAGE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Akio Ogura, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 57 days.

(21) Appl. No.: 17/558,441

(22) Filed: Dec. 21, 2021

(65) Prior Publication Data

US 2023/0015014 A1 Jan. 19, 2023

(30) Foreign Application Priority Data

Jul. 15, 2021 (JP) ................................ 2021-117164

(51) Int. Cl.
*G05F 1/575* (2006.01)
*G05F 1/46* (2006.01)
*G05F 3/26* (2006.01)

(52) U.S. Cl.
CPC .............. *G05F 1/575* (2013.01); *G05F 1/468* (2013.01); *G05F 3/262* (2013.01)

(58) Field of Classification Search
CPC .......... G05F 1/462; G05F 1/465; G05F 1/468; G05F 1/56; G05F 1/575; G05F 1/562;
(Continued)

(56) References Cited

U.S. PATENT DOCUMENTS 6,157,176 A * 12/2000 Pulvirenti ............... G05F 1/565 323/277
6,483,727 B2 * 11/2002 Oki ........................... H02J 1/02 323/280

(Continued)

FOREIGN PATENT DOCUMENTS

JP 2001-075663 A 3/2001
JP 2010-256990 A 11/2010

(Continued)

OTHER PUBLICATIONS

Notice of Reasons for Refusal mailed May 7, 2024, in corresponding Japanese Patent Application No. 2021-117164, 11 pages (with Translation).

*Primary Examiner* — Thienvu V Tran
*Assistant Examiner* — Nusrat Quddus
(74) *Attorney, Agent, or Firm* — Kim & Stewart LLP

(57) ABSTRACT

According to one embodiment, a constant voltage circuit includes: a first gain stage configured to output a first voltage amplified based on an output voltage and a reference voltage; a first transistor configured to control the output voltage based on the first voltage applied to a gate; and a second circuit configured to control a first signal based on a second voltage obtained by delaying an output timing of the output voltage and a third voltage that is based on the output voltage. In a case of the first signal being at a first logic level, a first current flows through the first gain stage, and in a case of the first signal being at a second logic level, a second current flows through the first gain stage.

11 Claims, 15 Drawing Sheets

(58) Field of Classification Search
CPC .......... G05F 1/565; G05F 1/567; G05F 1/569; G05F 1/571; G05F 1/573; G05F 1/5735
See application file for complete search history.

(56) References Cited

U.S. PATENT DOCUMENTS 7,459,886 B1 * 12/2008 Potanin ................. H02J 7/0068 320/135
7,656,224 B2 * 2/2010 Perez ........................ H03F 1/30 323/284
7,859,507 B2 * 12/2010 Jang ....................... G11C 19/28 377/64
7,919,954 B1 * 4/2011 Mannama ............... G05F 1/565 323/272
RE42,335 E * 5/2011 Man ........................ G05F 1/575 323/224
8,054,055 B2 * 11/2011 Mandal ................... G05F 1/575 323/280
8,253,404 B2 * 8/2012 Yoshii ................. H03F 3/45475 323/299
8,253,452 B2 * 8/2012 Kushnarenko ............ G05F 3/30 327/143
8,570,098 B2 * 10/2013 Jinbo ...................... G05F 1/565 323/280
8,674,672 B1 * 3/2014 Johal ....................... G05F 1/575 323/280
8,716,993 B2 * 5/2014 Kadanka ................. G05F 1/565 323/280
8,981,746 B2 * 3/2015 Napravnik .............. G05F 1/575 323/280
9,099,995 B2 * 8/2015 Hinrichs ............... H03L 7/0995
9,122,292 B2 * 9/2015 Pan ......................... G05F 1/575
9,122,293 B2 * 9/2015 Price ....................... G05F 1/613
9,170,590 B2 * 10/2015 Price ....................... G05F 1/468
9,529,374 B2 * 12/2016 Enjalbert ................ G05F 1/575
9,651,962 B2 * 5/2017 Bernardon .............. G05F 1/575
9,740,223 B1 * 8/2017 Wang ...................... G05F 1/575
9,812,958 B2 * 11/2017 Utsunomiya ........... G05F 1/565
9,946,283 B1 * 4/2018 Yung ....................... G05F 1/575
10,108,209 B2 * 10/2018 Ideno ....................... H02H 9/04
10,175,708 B2 1/2019 Ogura
10,191,503 B2 * 1/2019 Ogura ..................... G05F 1/468
10,416,694 B2 * 9/2019 Ono ........................ G05F 1/565
10,481,625 B2 * 11/2019 Kurozo ................... G05F 1/575
10,680,504 B2 * 6/2020 Kawano .................. H02M 1/08
10,996,699 B2 * 5/2021 Liu ......................... G05F 1/575
11,106,229 B2 * 8/2021 Ideno ................... H02H 1/0007
11,201,463 B2 * 12/2021 Peterson ................ H02H 9/002
11,204,613 B2 * 12/2021 Zhang ..................... G05F 1/573
11,480,985 B2 * 10/2022 Zhong ..................... G05F 1/575
11,614,761 B2 * 3/2023 Lee ......................... G05F 1/569 327/541
2006/0022652 A1 * 2/2006 Nishimura .............. G05F 1/575 323/280
2009/0224737 A1 * 9/2009 Lou ......................... G05F 1/563 323/280
2013/0099771 A1 * 4/2013 Terada ............. G01R 19/16566 323/315
2013/0320942 A1 * 12/2013 Vemula ................... G05F 1/573 323/265
2014/0354249 A1 * 12/2014 Kurozo ................... G05F 1/575 323/271
2015/0042301 A1 * 2/2015 Narwal ..................... G05F 3/08 323/281
2016/0116927 A1 * 4/2016 Chen ....................... G05F 1/575 323/280
2019/0286180 A1 * 9/2019 Sakaguchi .............. G05F 1/571
2019/0294189 A1 * 9/2019 Sakaguchi .............. G05F 1/565
2020/0278710 A1 * 9/2020 Sankman ................ G05F 1/575
2023/0168703 A1 * 6/2023 Okpara ............... H03F 3/45475 323/280

FOREIGN PATENT DOCUMENTS

JP 2012-043259 A 3/2012
JP 2012-155395 A 8/2012
JP 2018-128868 A 8/2018
JP 2018-185617 A 11/2018

* cited by examiner

CONSTANT VOLTAGE CIRCUIT THAT SELECTS OPERATION MODES BASED ON OUTPUT VOLTAGE

CROSS-REFERENCE TO RELATED APPLICATIONS

This application is based upon and claims the benefit of priority from Japanese Patent Application No. 2021-117164, filed Jul. 15, 2021, the entire contents of which are incorporated herein by reference.

FIELD

Embodiments described herein relate generally to a constant voltage circuit.

BACKGROUND

As one type of constant voltage circuit, a linear regulator has been known.

DETAILED DESCRIPTION

Figure 1:
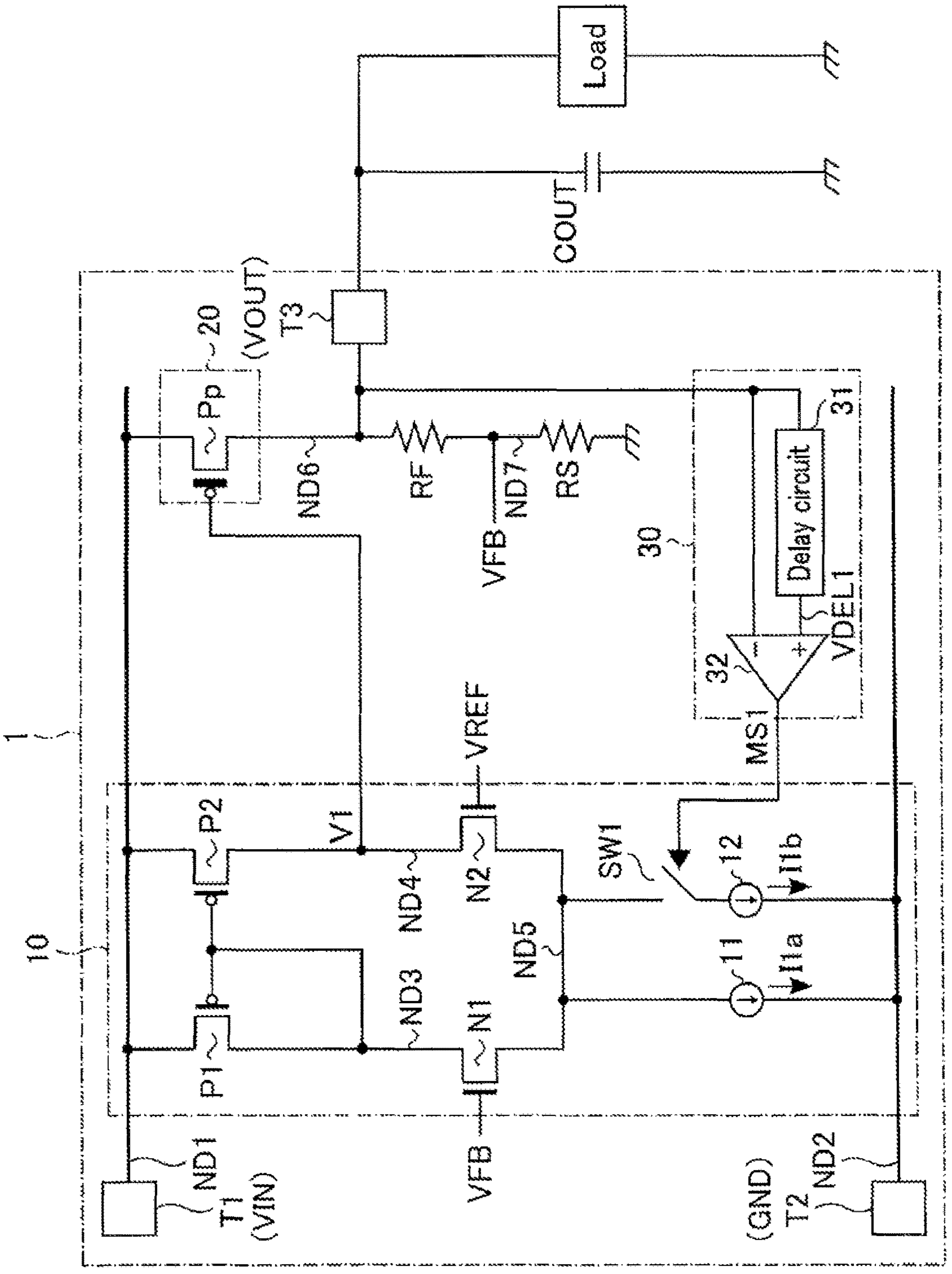
FIG. 1 is a circuit diagram showing an example of a constant voltage circuit according to a first embodiment.

In general, according to one embodiment, a constant voltage circuit includes: a first gain stage configured to output a first voltage obtained by amplifying a difference between a reference voltage and a divided voltage obtained by dividing an output voltage; a first transistor including a first end, a second end, and a gate, the first end being coupled to an input voltage terminal, the second end being coupled to an output voltage terminal, the first transistor being configured to control the output voltage based on the first voltage applied to the gate; and a second circuit containing a first circuit configured to output a second voltage obtained by delaying an output timing of the output voltage, the second circuit being configured to control a first signal based on a voltage difference between the second voltage and a third voltage that is based on the output voltage. In a case of the first signal being at a first logic level, a first operation mode is selected so that a first current flows through the first gain stage, and in a case of the first signal being at a second logic level, a second operation mode is selected so that a second current greater than the first current flows through the first gain stage.

Hereinafter, embodiments will be described with reference to the accompanying drawings. In the following description, components having substantially the same function and configuration will be assigned the same reference numeral, and repeat descriptions may be omitted. All descriptions of an embodiment are applicable to another embodiment unless expressly or implicitly excluded.

The function blocks do not have to be distinguished as in the example that follows. For example, some of the functions may be implemented by a function block other than the function blocks to be described as an example. In addition, the function blocks to be described as an example may be further divided into functional sub-blocks. Embodiments are not limited by which function block specifies them.

In the specification and the claims described herein, a first component being “coupled” to a second element includes the first component being coupled to the second component directly or through the intervention of a component that is constantly conductive or selectively conductive.

1. First Embodiment

A constant voltage circuit according to a first embodiment will be described. In the present embodiment, a linear regulator will be described as an example of a constant voltage circuit.

The constant voltage circuit according to the present embodiment includes, as operation modes, a low current consumption mode and a high-speed response mode. The low current consumption mode is selected to suppress current consumption when, for example, there is no load. The high-speed response mode is selected to cause the constant voltage circuit to operate at a high speed when, for example, a load is generated to cause the fluctuations in output voltage.

1.1. Configuration

1.1.1 Circuit Configuration of Constant Voltage Circuit

A circuit configuration of a constant voltage circuit according to a present embodiment will be described with reference to FIG. 1. FIG. 1 is a circuit diagram showing an example of the constant voltage circuit according to the present embodiment. Hereinafter, when a source and a drain of a transistor are not distinguished from each other, one of them will be referred to as “one end of a transistor or a first end of a transistor” and the other of them will be referred to as “the other end of the transistor or a second end of the transistor.”

A constant voltage circuit 1 contains an input voltage terminal T1, a reference voltage terminal T2, an output voltage terminal T3, a first gain stage 10, an output stage 20, a first voltage monitor circuit 30, and resistance elements RF and RS.

The constant voltage circuit 1 functions as an amplifier including the first gain stage 10 and the output stage 20.

The input voltage terminal T1 is coupled to a node ND1 (hereinafter, also referred to as a "power supply voltage interconnect") and an input voltage VIN is externally applied to the input voltage terminal T1.

The reference voltage terminal T2 is coupled to a node ND2 (hereinafter, also referred to as a "ground voltage interconnect"). For example, the reference voltage terminal T2 may be grounded, or a ground voltage (VSS) may be applied to the reference voltage terminal T2.

The output voltage terminal T3 is coupled to a node ND6. The output voltage terminal T3 outputs an output voltage VOUT. For example, when using the constant voltage circuit 1, a capacitance element COUT is coupled between the output voltage terminal T3 and a Load coupled to an outside of the constant voltage circuit 1. The capacitance element COUT functions as an output capacitor. The capacitance element COUT suppresses, for example, fluctuations in the Load coupled to the output voltage terminal T3, variations in output voltage VOUT due to an influence of, e.g., parasitic inductance occurring between the constant voltage circuit 1 and the Load, oscillations, and the like. For example, one electrode of the capacitance element COUT is coupled to the output voltage terminal T3, and the other electrode is grounded (coupled to the ground voltage interconnect).

The resistance elements RF and RS each function as a voltage divider circuit of the output voltage VOUT. One end of the resistance element RF is coupled to the node ND6, and the other end is coupled to a node ND7. One end of the resistance element RS is coupled to the node ND7, and the other end is grounded (coupled to the ground voltage interconnect). A voltage applied to the node ND7 will be referred to as a "feedback voltage VFB", a resistance value of the resistance element RF will be referred to as "rF", and a resistance value of the resistance element RS will be referred to as "rS". Then, the output voltage VOUT and the voltage VFB establish a relationship of $VOUT=VFB\times(1+rF/rS)$. That is, the voltage VFB is a divided voltage obtained by dividing the output voltage VOUT.

The first gain stage 10 is a differential amplifier circuit. The first gain stage 10 compares a reference voltage VREF with the voltage VFB, and outputs a voltage corresponding to (amplified correspondingly) their difference to the output stage 20. The first gain stage 10 includes p-channel Metal Oxide Semiconductor Field Effect Transistors (MOSFET) (hereinafter, also referred to as "PMOS transistors") P1 and P2, n-channel MOSFETs (hereinafter, also referred to as "NMOS transistors") N1 and N2, current sources 11 and 12, and a switch circuit SW1.

One end of the PMOS transistor P1 is coupled to the node ND1, and the other end and a gate are coupled to a node ND3.

One end of the PMOS transistor P2 is coupled to the node ND1, the other end is coupled to a node ND4, and a gate is coupled to the node ND3. That is, the PMOS transistors P1 and P2 form a current mirror.

One end of the NMOS transistor N1 is coupled to the node ND3, and the other end is coupled to a node ND5. The voltage VFB is applied to a gate of the NMOS transistor N1.

One end of the NMOS transistor N2 is coupled to the node ND4, and the other end is coupled to the node ND5. The reference voltage VREF is applied to a gate of the NMOS transistor N2. The reference voltage VREF is a constant reference voltage which does not depend on the temperature or the input voltage VIN.

One end of the current source 11 is coupled to the node ND5, and the other end is coupled to the node ND2. A current I1a flows from the current source 11 to the node ND2.

One end of the switch circuit SW1 is coupled to the node ND5, and the other end is coupled to one end of the current source 12. The switch circuit SW1 operates based on a mode signal MS1 received from the first voltage monitor circuit 30. For example, the mode signal MS1 is set to an "H" level in the case of the high-speed response mode and is set to an "L" level in the case of the low current consumption mode. For example, the switch circuit SW1 is turned on (turned to an ON state (a coupled state)) in the case of the mode signal MS1 being at the "H" level, and is turned off (turned to an OFF state (a decoupled state)) in the case of the mode signal MS1 being at the "L" level.

The other end of the current source 12 is coupled to the node ND2. A current I1b flows from the current source 12 to the node ND2. For example, the current I1b is a current greater than the current I1a. For example, the operation current I1b may be 100 times greater than the operation current I1a. In the case of the low current consumption mode, the operation current I1a flows through the first gain stage 10 (differential amplifier circuit). In the case of the high-speed response mode, an operation current (I1a+I1b) flows through the first gain stage 10. The operation current (I1a+I1b) is greater than the operation current I1a. Therefore, the high-speed response mode enables the output stage 20 in the subsequent stage to be driven at a higher speed than the low current consumption mode.

The output stage 20 controls the output voltage VOUT of the constant voltage circuit 1. The output stage 20 includes a PMOS transistor Pp.

One end of the PMOS transistor Pp is coupled to the node ND1, and the other end is coupled to the node ND6. The node ND4 is coupled to a gate of the PMOS transistor Pp. In other words, the output voltage V1 of the first gain stage 10 is applied to the gate of the PMOS transistor Pp. The PMOS transistor Pp functions as an output driver of the constant voltage circuit 1. To make the output voltage VOUT constant, a gate voltage of the PMOS transistor Pp fluctuates in accordance with fluctuations in output voltage VOUT, and an ON resistance of the PMOS transistor Pp is adjusted.

For example, in the case of no voltage difference between the reference voltage VREF and the voltage VFB, that is, in the case of VFB=VREF, the output voltage VOUT is expressed as $VOUT=VREF\times(1+rF/rS)$. The formula that expresses the output voltage VOUT does not contain a term of the input voltage VIN or a load current flowing through the Load. Therefore, the output voltage VOUT can maintain a constant voltage even when the input voltage VIN and the Load fluctuate.

The first voltage monitor circuit 30 contains a delay circuit 31 and a comparator 32.

The delay circuit 31 is coupled to the output voltage terminal T3 and a non-inversion input terminal of the comparator 32. The output voltage VOUT is applied from the output voltage terminal T3 to the delay circuit 31. The delay circuit 31 delays an output timing of the output voltage VOUT, and outputs the output voltage VOUT as a voltage VDEL1 at the delayed output timing to the non-inversion input terminal of the comparator 32. The configuration of the delay circuit 31 will be described later in detail.

An inversion input terminal of the comparator 32 is coupled to the output voltage terminal T3. The output voltage VOUT is applied from the output voltage terminal T3 to the inversion input terminal of the comparator 32. The voltage VDEL1 is applied from the delay circuit 31 to the non-inversion input terminal of the comparator 32. The mode signal MS1 is output from an output terminal of the comparator 32. For example, in the case where the voltage VOUT drops, the voltage VDEL1 thereafter drops at a timing delayed by the delay circuit 31. This causes a potential difference between the voltage VOUT and the voltage VDEL1. During a period in which the voltage VOUT is smaller than the voltage VDEL1, that is, a period in which the high-speed response mode is selected, the comparator 32 outputs the mode signal MS1 at the "H" level. On the other hand, during a period in which the voltage VOUT is greater than or equal to the voltage VDEL1, that is, a period in which the low current consumption mode is selected, the comparator 32 outputs the mode signal MS1 at the "L" level.

Transistors used for the delay circuit 31 and the comparator 32 are smaller in element size than the PMOS transistor Pp, so that operational delay caused due to a parasitic capacitance is relatively small.

1.1.2 Configuration of Delay Circuit 31

Figure 2:
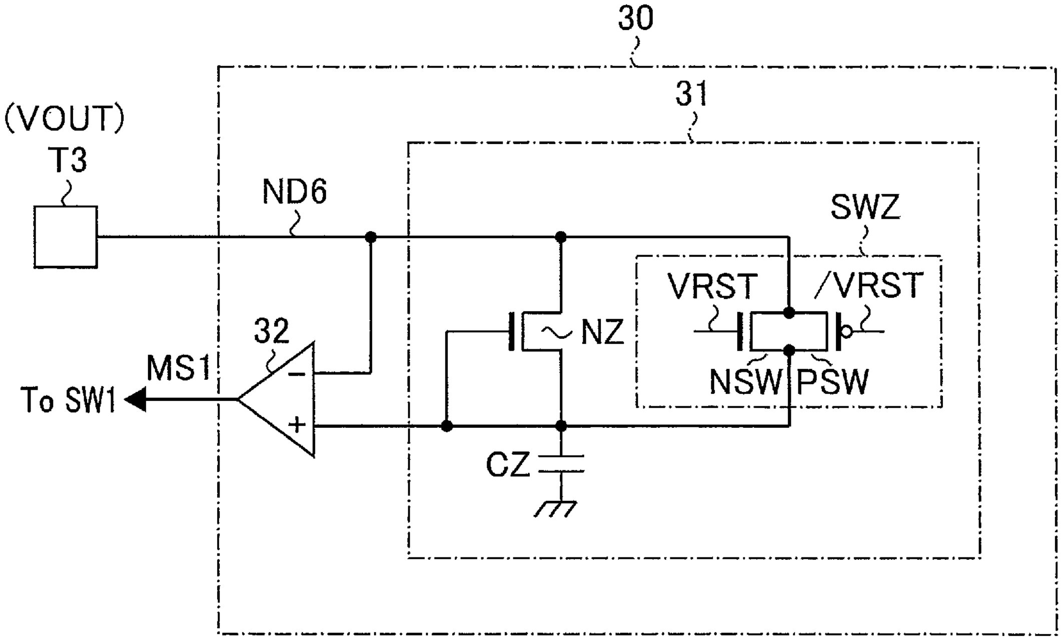
FIG. 2 is a circuit diagram showing an example of a delay circuit in a first voltage monitor circuit contained in the constant voltage circuit according to the first embodiment.

A circuit configuration of the delay circuit 31 will be described with reference to FIG. 2. FIG. 2 is a circuit diagram showing an example of the delay circuit 31 in the first voltage monitor circuit 30 contained in the constant voltage circuit 1 according to the present embodiment.

The delay circuit 31 contains an NMOS transistor NZ, a capacitance element CZ, and a switch circuit SWZ.

One end of the NMOS transistor NZ is coupled to the node ND6, and the other end and a gate are coupled to the non-inversion input terminal of the comparator 32. The NMOS transistor NZ is constituted by, for example, a MOSFET of a depletion type, and has a relatively high resistance component (impedance). Instead of the NMOS transistor NZ, a resistance element having a relatively high resistance component may be provided.

One end of the capacitance element CZ is coupled to the non-inversion input terminal of the comparator 32, and the other end is grounded (coupled to the ground voltage interconnect).

The switch circuit SWZ contains an NMOS transistor NSW and a PMOS transistor PSW.

One end of the NMOS transistor NSW is coupled to the node ND6, and the other end is coupled to the non-inversion input terminal of the comparator 32. A voltage VRST is applied to a gate of the NMOS transistor NSW.

One end of the PMOS transistor PSW is coupled to the node ND6, and the other end is coupled to the non-inversion input terminal of the comparator 32. A voltage/VRST is applied to a gate of the PMOS transistor PSW. The voltage/VRST is a voltage obtained by inverting a logic level of the voltage VRST.

The delay circuit 31 maintains the output voltage VOUT of the output voltage terminal T3 observed a certain period (for example, several tens of microseconds) earlier, for the following reason. When the output voltage VOUT fluctuates, a current flows via the NMOS transistor NZ;

however, discharging of charge stored in the capacitance element CZ and charging of the capacitance element CZ take time. Thus, the voltage VOUT maintained by the delay circuit 31 fluctuates (is updated) later. Therefore, the delay circuit 31 can delay an output timing of the voltage VOUT applied from the output voltage terminal T3. That is, the delay circuit 31 can output the voltage VOUT observed a certain period earlier.

The switch circuit SWZ enables the node ND6 and the non-inversion input terminal of the comparator 32 to be coupled together. When the switch circuit SWZ is turned on by setting the voltage VRST to the "H" level, no potential difference is caused between the node ND6 and the non-inversion input terminal of the comparator 32. Therefore, the comparator 32 outputs the mode signal MS1 at the "L" level. When the comparator 32 frequently switches ON/OFF of the switch circuit SW1, there is a possibility that the operation stability of the constant voltage circuit 1 will be impaired. For this reason, in the case where, for example, there is a load in the output voltage terminal T3 and it is no longer free of the load, the switch circuit SWZ may be turned on. The switch circuit SWZ may be eliminated from the delay circuit 31.

1.2 Mode Selection Operation

Figure 3:
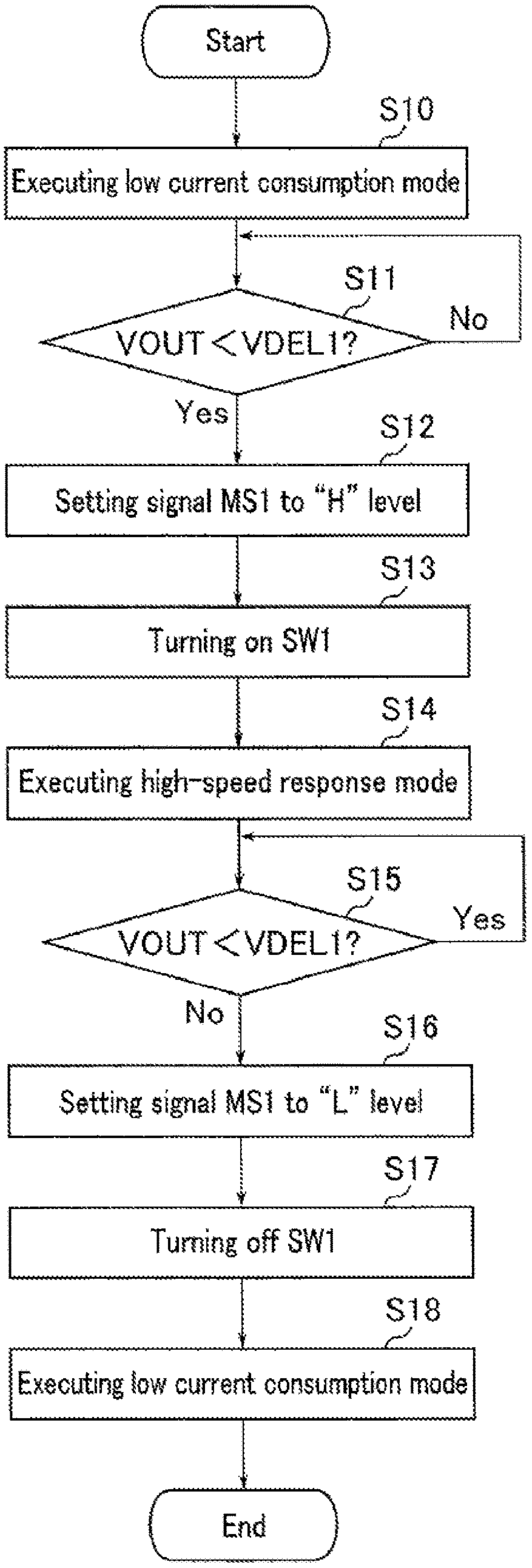
FIG. 3 is a flowchart showing a mode selection operation of the constant voltage circuit according to the first embodiment.

A mode selection operation of the constant voltage circuit 1 according to a present embodiment will be described with reference to FIG. 3. FIG. 3 is a flowchart showing a mode selection operation of the constant voltage circuit 1 according to the present embodiment. The following will describe, as an example, the case in which the constant voltage circuit 1 transitions from the low current consumption mode to the high-speed response mode, and thereafter transitions from the high-speed response mode to the low current consumption mode.

The constant voltage circuit 1 executes the low current consumption mode (S10). At the time of execution of S10, the first voltage monitor circuit 30 sets the mode signal MS1 to the "L" level. The switch circuit SW1 is turned to the OFF state based on the mode signal MS1 at the "L" level.

In the case of the output voltage VOUT being greater than or equal to the voltage VDEL1 (S11_No), the first voltage monitor circuit 30 maintains the mode signal MS1 at the "L" level. That is, the constant voltage circuit 1 maintains the low current consumption mode.

On the other hand, in the case of the output voltage VOUT being smaller than the voltage VDEL1 (S11_Yes), the first voltage monitor circuit 30 sets the mode signal MS1 to the "H" level (S12). In other words, the comparator 32 outputs the voltage at the "H" level during a period in which in the comparator 32, the voltage VOUT of the inversion input terminal is smaller than the voltage VDEL1 of the non-inversion input terminal.

Upon receipt of the mode signal MS1 at the "H" level, the switch circuit SW1 is turned to the ON state (S13). As a result, the constant voltage circuit 1 executes the high-speed response mode (S14).

In the case of the output voltage VOUT being smaller than the voltage VDEL1 (S15_Yes), the first voltage monitor circuit 30 maintains the mode signal MS1 at the "H" level. That is, the constant voltage circuit 1 maintains the high-speed response mode.

On the other hand, in the case of the output voltage VOUT being greater than or equal to the voltage VDEL1 (S15_No), the first voltage monitor circuit 30 sets the mode signal MS1 to the "L" level (S16). In other words, the comparator 32 outputs the voltage at the "L" level during a period in which in the comparator 32, the voltage VOUT of the inversion input terminal is greater than or equal to the voltage VDEL1 of the non-inversion input terminal.

Upon receipt of the mode signal MS1 at the "L" level, the switch circuit SW1 is turned to the OFF state (S17). As a result, the constant voltage circuit 1 executes the low current consumption mode (S18).

1.3 Advantageous Effect

Figure 4:
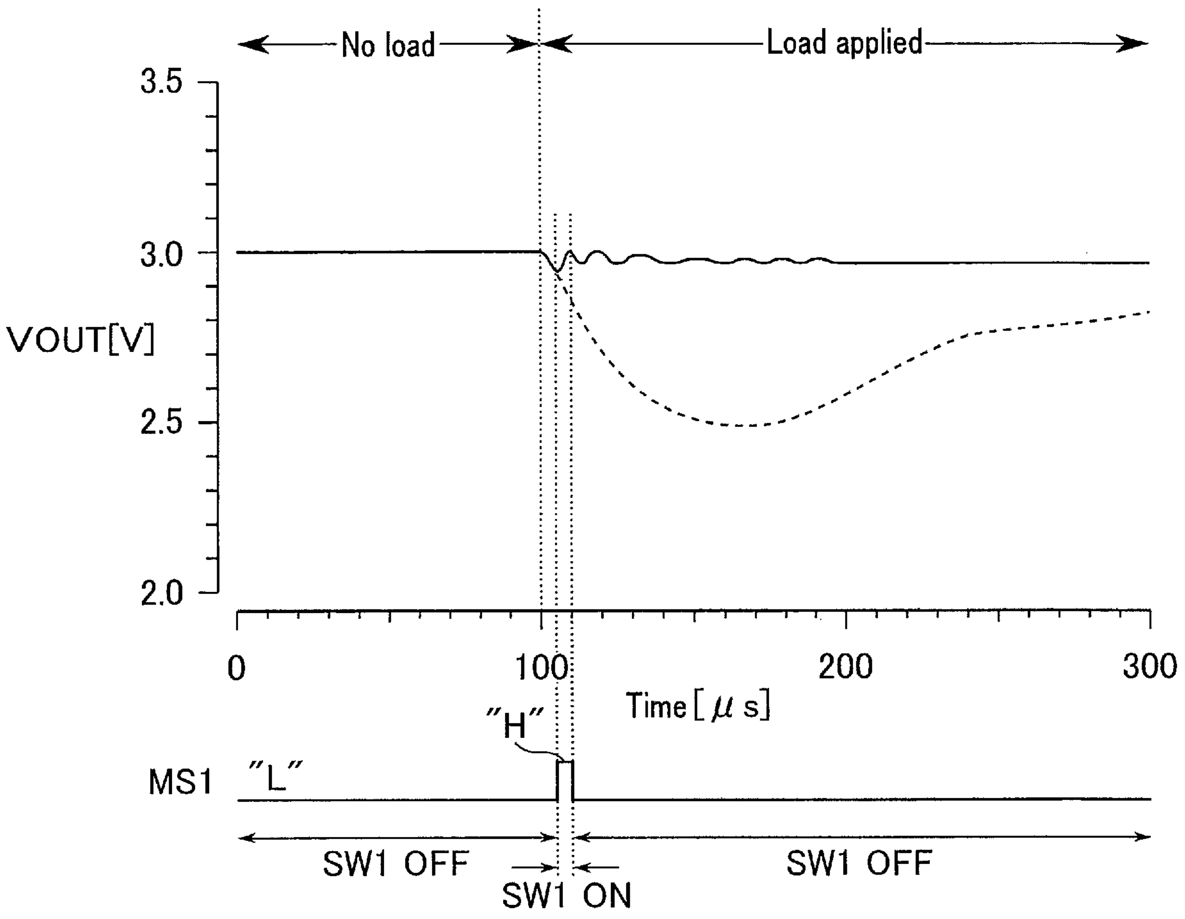
FIG. 4 is a diagram illustrating the advantageous effect of the constant voltage circuit according to the first embodiment.

The configuration according to the present embodiment can realize a high-speed response and a low power consumption of the constant voltage circuit. Hereinafter, this advantageous effect will be described with reference to FIG. 4. FIG. 4 is a diagram illustrating the advantageous effect of the constant voltage circuit 1 according to the present embodiment.

In FIG. 4, the solid line indicates the fluctuation in output voltage of the constant voltage circuit 1 according to the present embodiment, and the broken line indicates the fluctuation in output voltage of the constant voltage circuit according to a comparative example. Furthermore, FIG. 4 illustrates the mode signal MS1 that the first voltage monitor circuit 30 outputs and the operation of the switch circuit SW1 that controls additions of a constant voltage based on the mode signal MS1 in the constant voltage circuit 1 according to the present embodiment. The vertical axis of FIG. 4 represents an output voltage VOUT[V] of the output voltage terminal T3. The horizontal axis represents a time [μs]. The constant voltage circuit is designed to output 3 V. That is, the output voltage of the constant voltage circuit in a steady state is 3 V. There is no load during a period from 0 μs to 100 μs, and the Load is coupled at the time of 100 μs.

First, the constant voltage circuit according to the comparative example will be described. The constant voltage circuit according to the comparative example corresponds to the constant voltage circuit 1 according to the present embodiment modified by removing therefrom the current source 12 and the switch circuit SW1 of the first gain stage 10, and the first voltage monitor circuit 30. That is, the constant voltage circuit according to the comparative example is described based on the case in which it constantly operates in the low current consumption mode.

As shown in FIG. 4, in the case of the constant voltage circuit according to the comparative example, the output voltage drops from 3 V by about 0.5 V after the time of 100 μs when the Load is coupled. The output voltage gradually rises after 170 μs; however, the output voltage is still not restored to 3 V even at the time of 300 μs. The constant voltage circuit according to the comparative example cannot respond at a high speed because the operation current I1a flows through the first gain stage 10. Therefore, in the case where the output voltage VOUT drops, the constant voltage circuit according to the comparative example requires a relatively long period to restore the output voltage VOUT to the set voltage of 3 V.

On the other hand, in the case of the constant voltage circuit 1 according to the present embodiment, when the output voltage VOUT drops at the time of 100 μs, the first voltage monitor circuit 30 sets the mode signal MS1 to the "H" level at the time of 105 μs. In this manner, the switch circuit SW1 is turned to the ON state, and the current (I1a+I1b) flows through the first gain stage 10. That is, the constant voltage circuit 1 transitions to the high-speed response mode. In this manner, in the case where the output voltage VOUT drops, a period until the output voltage VOUT is restored to the set voltage of 3 V can be made shorter than that of the constant voltage circuit according to the comparative example. In the case where a delay period caused by the delay circuit 31 is 5 μs, the first voltage monitor circuit 30 restores the mode signal MS1 to the "L" level at the time of 110 μs. In this manner, the switch circuit SW1 is turned to the OFF state, and the current I1a flows through the first gain stage 10. That is, the constant voltage circuit 1 transitions to the low current consumption mode.

As described in the above, when the output voltage VOUT drops, the constant voltage circuit 1 according to the present embodiment can switch the operation mode from the low current consumption mode to the high-speed response mode. Accordingly, the high-speed response can be realized.

Furthermore, the constant voltage circuit 1 according to the present embodiment operates in the low current consumption mode during a period in which, for example, there is no load. Accordingly, the low power consumption can be realized.

In addition, the constant voltage circuit 1 according to the present embodiment compares the output voltage VOUT with the voltage VOUT observed a certain period earlier. This eliminates the necessity of providing a circuit that generates a threshold voltage for switching operation modes at relatively high accuracy.

1.4 Modification

The constant voltage circuit 1 according to the modification of the first embodiment will be described. The constant voltage circuit 1 according to the present modification differs from the first embodiment in that the first voltage monitor circuit 30 contains an offset circuit 33. The flowchart showing the mode selection operation is similar to that of FIG. 3 according to the first embodiment. The following description will in principle concentrate on the features different from the first embodiment.

1.4.1 Circuit Configuration of Constant Voltage Circuit 1

Figure 5:
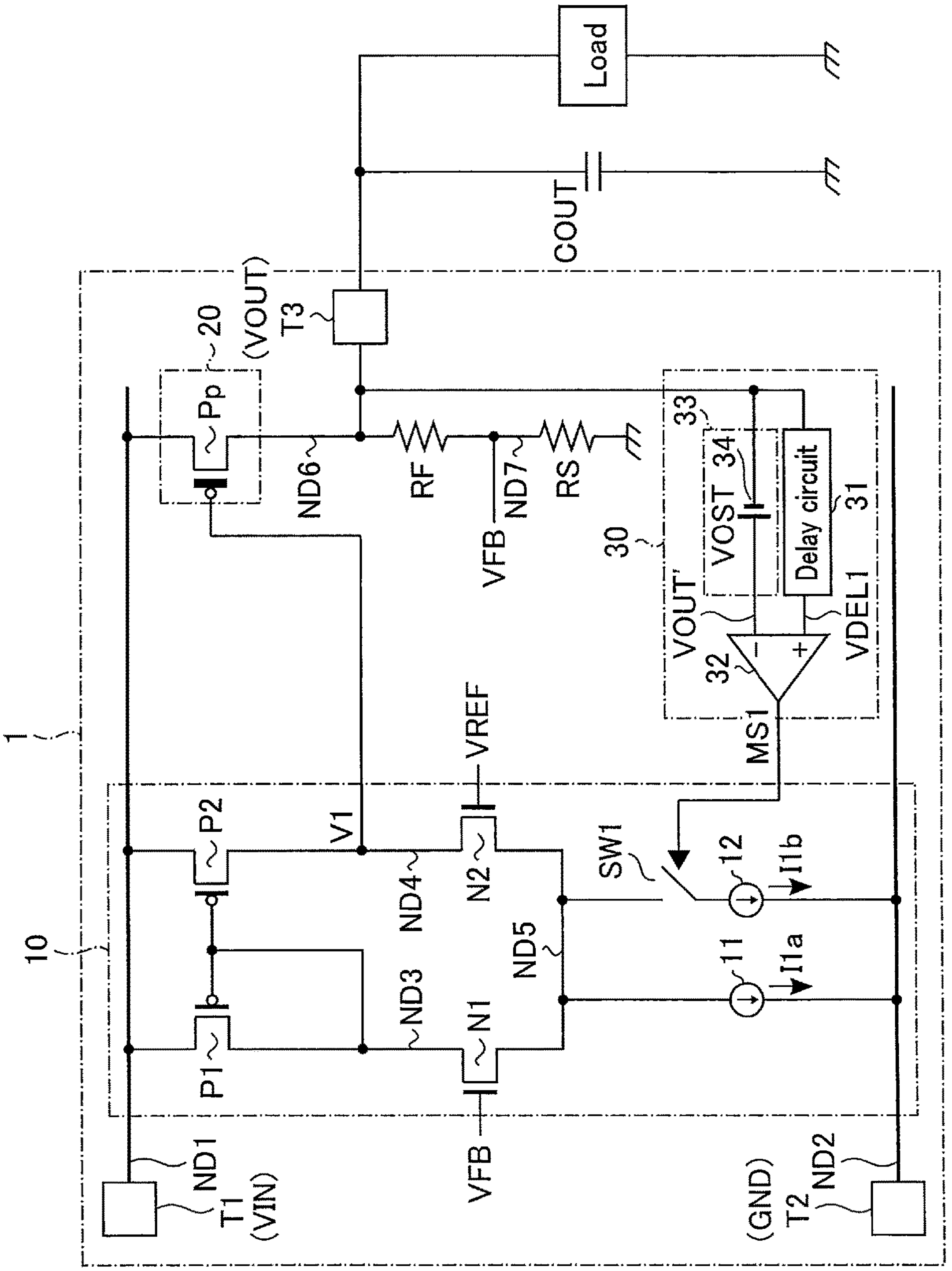
FIG. 5 is a circuit diagram showing an example of a constant voltage circuit according to a modification of the first embodiment.

The circuit configuration of the constant voltage circuit 1 according to the present modification will be described with reference to FIG. 5. FIG. 5 is a circuit diagram showing an example of the constant voltage circuit 1 according to the present modification.

The first voltage monitor circuit 30 in the constant voltage circuit 1 further contains the offset circuit 33.

The offset circuit 33 contains a positive voltage source 34. The offset circuit 33 is coupled to the output voltage terminal T3 and the inversion input terminal of the comparator 32. The output voltage VOUT is applied from the output voltage terminal T3 to the offset circuit 33. The offset circuit 33 outputs, as a voltage VOUT', a voltage obtained by adding the voltage VOST of the positive voltage source 34 to the output voltage VOUT to the inversion input terminal of the comparator 32. The offset circuit 33 may be provided in the comparator 32.

The voltage VOUT' is applied from the offset circuit 33 to the inversion input terminal of the comparator 32. For example, during a period in which the voltage VOUT' is smaller than the voltage VDEL1, that is, a period in which the high-speed response mode is selected, the comparator 32 outputs the mode signal MS1 at the "H" level. In other words, during a period in which the difference between the voltage VOUT and the voltage VDEL1 is greater than the voltage VOST of the voltage source 34, the comparator 32 outputs the mode signal MS1 at the "H" level. On the other hand, during a period in which the voltage VOUT' is greater than or equal to the voltage VDEL1, that is, a period in which the low current consumption mode is selected, the comparator 32 outputs the mode signal MS1 at the "L" level. In other words, during a period in which the difference between the voltage VOUT and the voltage VDEL1 is smaller than or equal to the voltage VOST of the voltage source 34, the comparator 32 outputs the mode signal MS1 at the "L" level.

The rest of the configuration of the constant voltage circuit 1 is similar to that of FIG. 1 according to the first embodiment.

1.4.2 Advantageous Effect

The configuration according to the present modification produces an advantageous effect similar to that of the first embodiment.

In the case where the comparator 32 has a negative offset, a voltage of the inversion input terminal of the comparator 32 drops due to the negative offset that the comparator 32 has, and there is a possibility that the comparator 32 will output an erroneous comparison result if there is no fluctuation in output voltage VOUT. The constant voltage circuit 1 according to the present modification contains the offset circuit 33 in the first voltage monitor circuit 30. The offset circuit 33 contains the positive voltage source 34. Therefore, the voltage of the inversion input terminal of the comparator 32 corresponds to a voltage obtained by adding the voltage VOST of the positive voltage source 34 to the output voltage VOUT applied from the output voltage terminal T3. Therefore, the constant voltage circuit 1 maintains the low power consumption in the case where the difference between the output voltage VOUT and the voltage VDEL1 is smaller than or equal to the voltage VOST of the voltage source 34.

2. Second Embodiment

The constant voltage circuit 1 according to a second embodiment will be described. The constant voltage circuit 1 according to the present embodiment differs from the first embodiment in terms of containing a current monitor circuit 40. Hereinafter, the following description will in principle concentrate on the features different from the first embodiment.

2.1 Circuit Configuration of Constant Voltage Circuit 1

Figure 6:
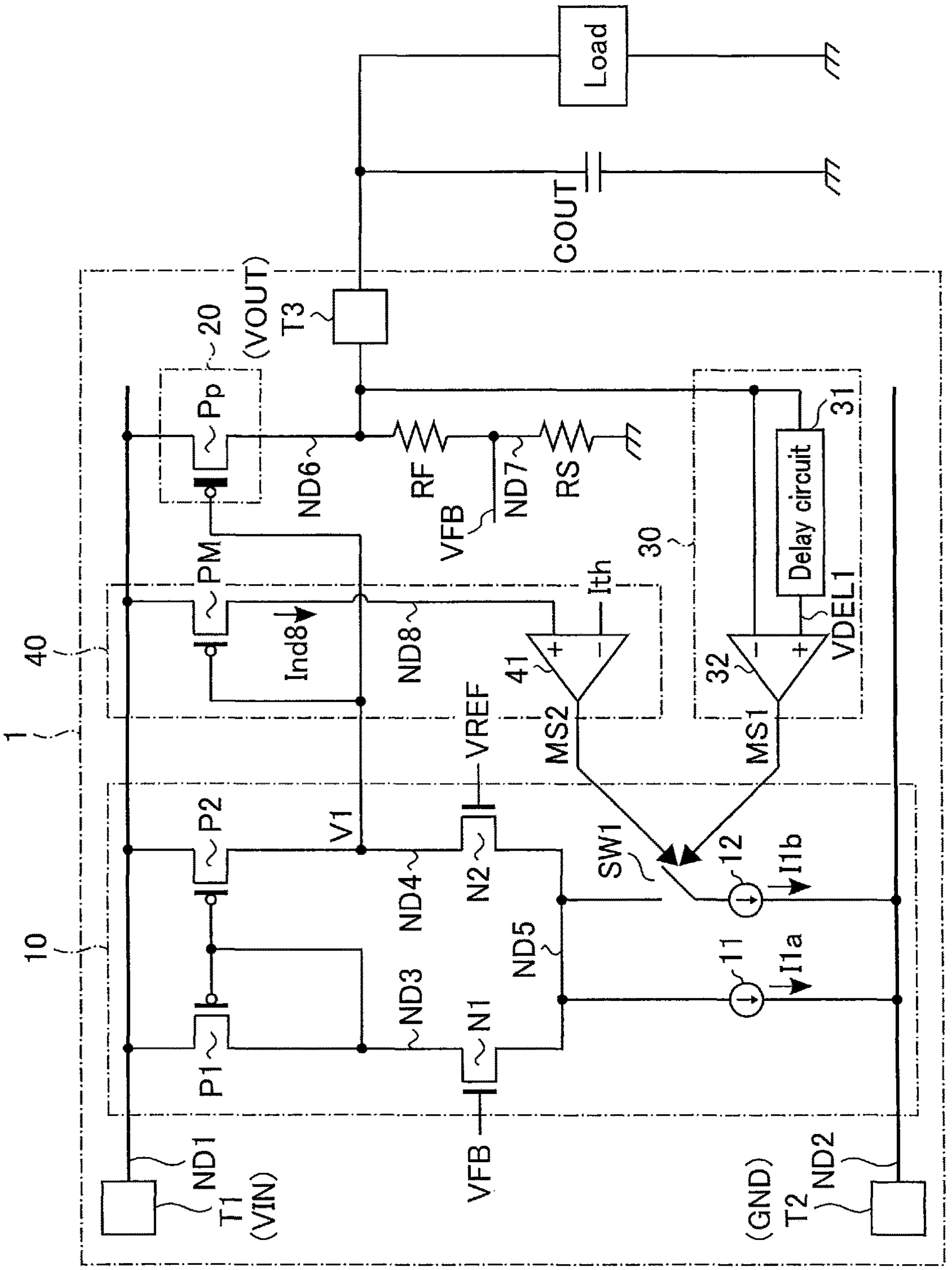
FIG. 6 is a circuit diagram showing an example of a constant voltage circuit according to a second embodiment.

A circuit configuration of the constant voltage circuit 1 according to the present embodiment will be described with reference to FIG. 6. FIG. 6 is a circuit diagram showing an example of the constant voltage circuit 1 according to the present embodiment.

The constant voltage circuit 1 further contains the current monitor circuit 40.

The current monitor circuit 40 monitors, in addition to an output voltage flowing through the output voltage terminal T3, a current flowing through the resistance elements RF and RS, that is, a current flowing through the PMOS transistor Pp. The current monitor circuit 40 contains a PMOS transistor PM and a comparator 41.

One end of the PMOS transistor PM is coupled to the node ND1 and the other end is coupled to a node ND8. The node ND4 is coupled to a gate of the PMOS transistor PM. In other words, the output voltage V1 of the first gain stage 10 is applied to the gate of the PMOS transistor PM as with the PMOS transistor Pp. For example, in the case where the voltage V1 fluctuates due to the fluctuation in output current (load current) of the constant voltage circuit 1, a current flowing through the node ND8 through the PMOS transistor PM (a current corresponding to a current flowing through the PMOS transistor Pp, hereinafter referred to as "current Ind8") fluctuates.

A threshold current Ith is supplied to an inversion input terminal of the comparator 41. The threshold current Ith is a current used for judgment of the current Ind8 flowing through the node ND8. A non-inversion input terminal of the comparator 41 is coupled to the node ND8. The current Ind8 flowing through the node ND8 is supplied to the non-inversion input terminal of the comparator 41. A mode signal MS2 is output from an output terminal of the comparator 41. For example, during a period in which the current Ind8 is greater than the threshold current Ith, the comparator 41 outputs the mode signal MS2 at the "H" level. On the other hand, during a period in which the current Ind8 is smaller than or equal to the threshold current Ith, the comparator 41 outputs the mode signal MS2 at the "L" level.

The switch circuit SW1 operates based on the mode signal MS1 received from the first voltage monitor circuit 30 and the mode signal MS2 received from the current monitor circuit 40. For example, the switch circuit SW1 is turned to the ON state in the case where at least one of the mode signals MS1 and MS2 is at the "H" level. In this manner, the high-speed response mode is selected. The switch circuit SW1 is turned to the OFF state in the case where both of the mode signals MS1 and MS2 are at the "L" level. In this manner, the low current consumption mode is selected. That is, the switch circuit SW1 is turned to the ON state or the OFF state based on a result of an OR operation on the mode signal MS1 and the mode signal MS2.

The rest of the configuration of the constant voltage circuit 1 is similar to that of FIG. 1 according to the first embodiment.

A value of the current I1b to be added may be varied between a time when the output voltage VOUT is dropped and a time when the load current is raised.

2.2 Mode Selection Operation

Figure 7:
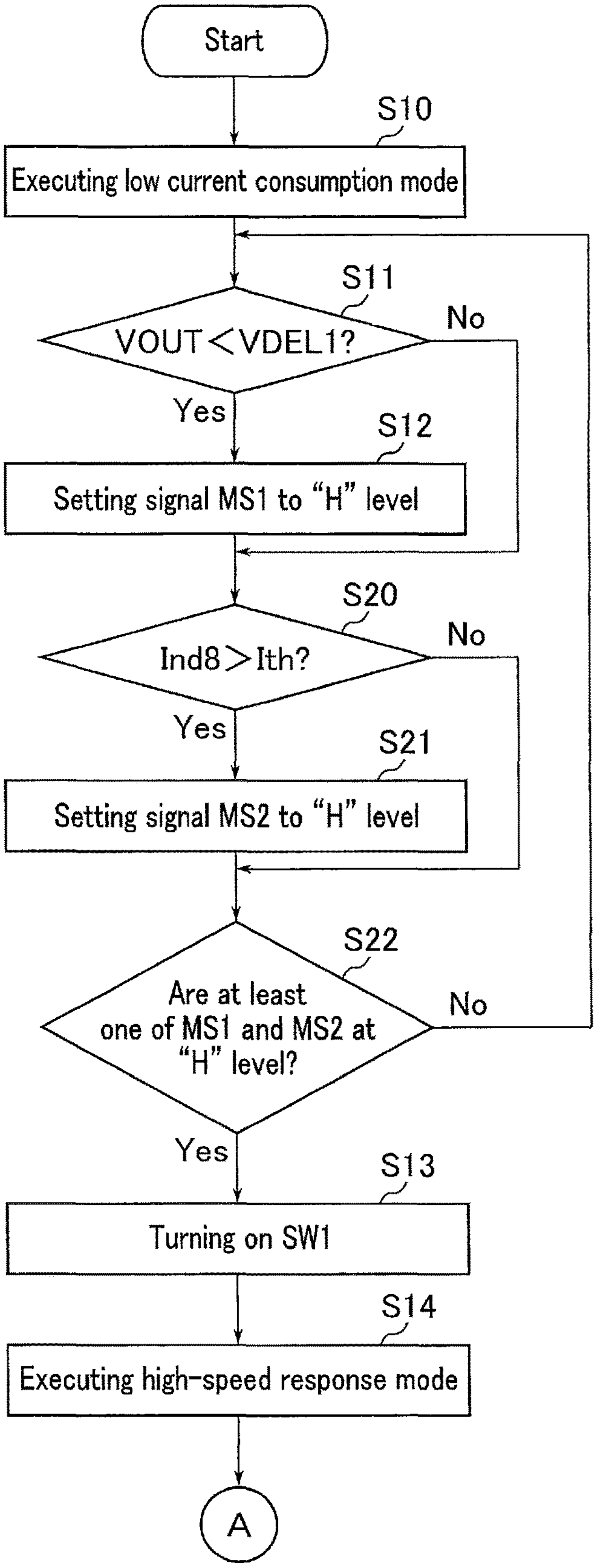
FIG. 7 is a flowchart showing a mode selection operation of the constant voltage circuit according to the second embodiment.
Figure 8:
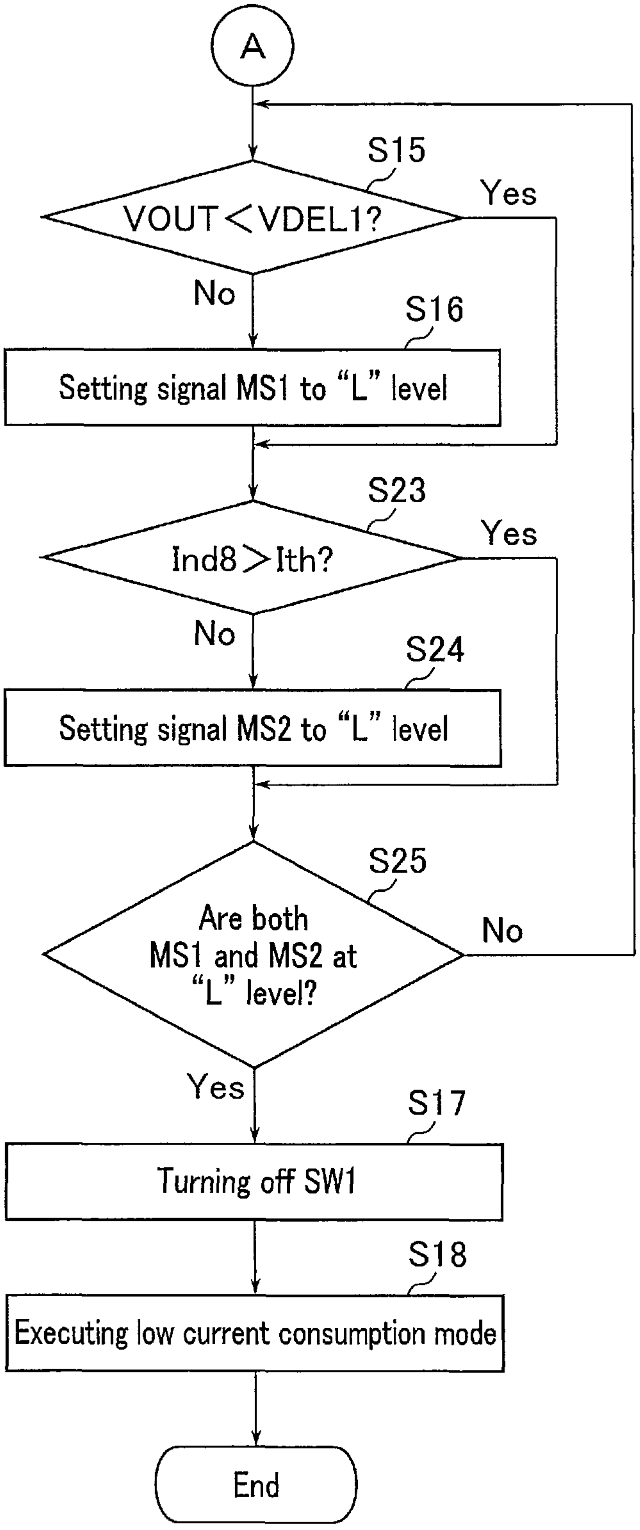
FIG. 8 is a flowchart showing the mode selection operation of the constant voltage circuit according to the second embodiment.

The mode selection operation of the constant voltage circuit 1 according to the present embodiment will be described with reference to FIG. 7 and FIG. 8. FIG. 7 and FIG. 8 are each a flowchart showing the mode selection operation of the constant voltage circuit 1 according to the present embodiment. The operation from S20 to S25 is added to the operation from S10 to S18 in FIG. 3 according to the first embodiment. The operation from S10 to S18 is similar to that shown in FIG. 3 according to the first embodiment. Hereinafter, the following description will in principle concentrate on the operation from S20 to S25.

After the execution of S10 to S12, the mode signal MS2 is at the "L" level.

In the case of the current Ind8 being smaller than or equal to the threshold current Ith (S20_No), the current monitor circuit 40 maintains the mode signal MS2 at the "L" level.

On the other hand, in the case where the current Ind8 is greater than the threshold current Ith (S20_Yes), the current monitor circuit 40 sets the mode signal MS2 at the "H" level (S21). In other words, the comparator 41 outputs the current at the "H" level during a period in which in the comparator 41, the current Ind8 of the non-inversion input terminal is greater than the threshold current Ith of the inversion input terminal.

The switch circuit SW1 maintains the OFF state in the case where both of the mode signals MS1 and MS2 are at the "L" level (S22_No). On the other hand, in the case where at least one of the mode signals MS1 and MS2 is at the "H" level (S22_Yes), the switch circuit SW1 is turned to the ON state (S13).

After the execution of S13 to S16, the mode signal MS2 is at the "H" level.

In the case where the current Ind8 is greater than the threshold current Ith (S23_Yes), the current monitor circuit 40 maintains the mode signal MS2 at the "H" level.

On the other hand, in the case where the current Ind8 is smaller than or equal to the threshold current Ith (S23_No), the current monitor circuit 40 sets the mode signal MS2 to the "L" level (S24). In other words, the comparator 41 outputs the current at the "L" level during a period in which in the comparator 41, the current Ind8 of the non-inversion input terminal is smaller than or equal to the threshold current Ith of the inversion input terminal.

In the case where at least one of the mode signals MS1 and MS2 is at the "H" level (S25_No), the switch circuit SW1 maintains the ON state. On the other hand, in the case where both of the mode signals MS1 and MS2 are at the "L" level (S25_Yes), the switch circuit SW1 is turned to the OFF state (S17).

2.3 Advantageous Effect

The configuration according to the present embodiment produces an advantageous effect similar to that of the first embodiment.

Figure 9:
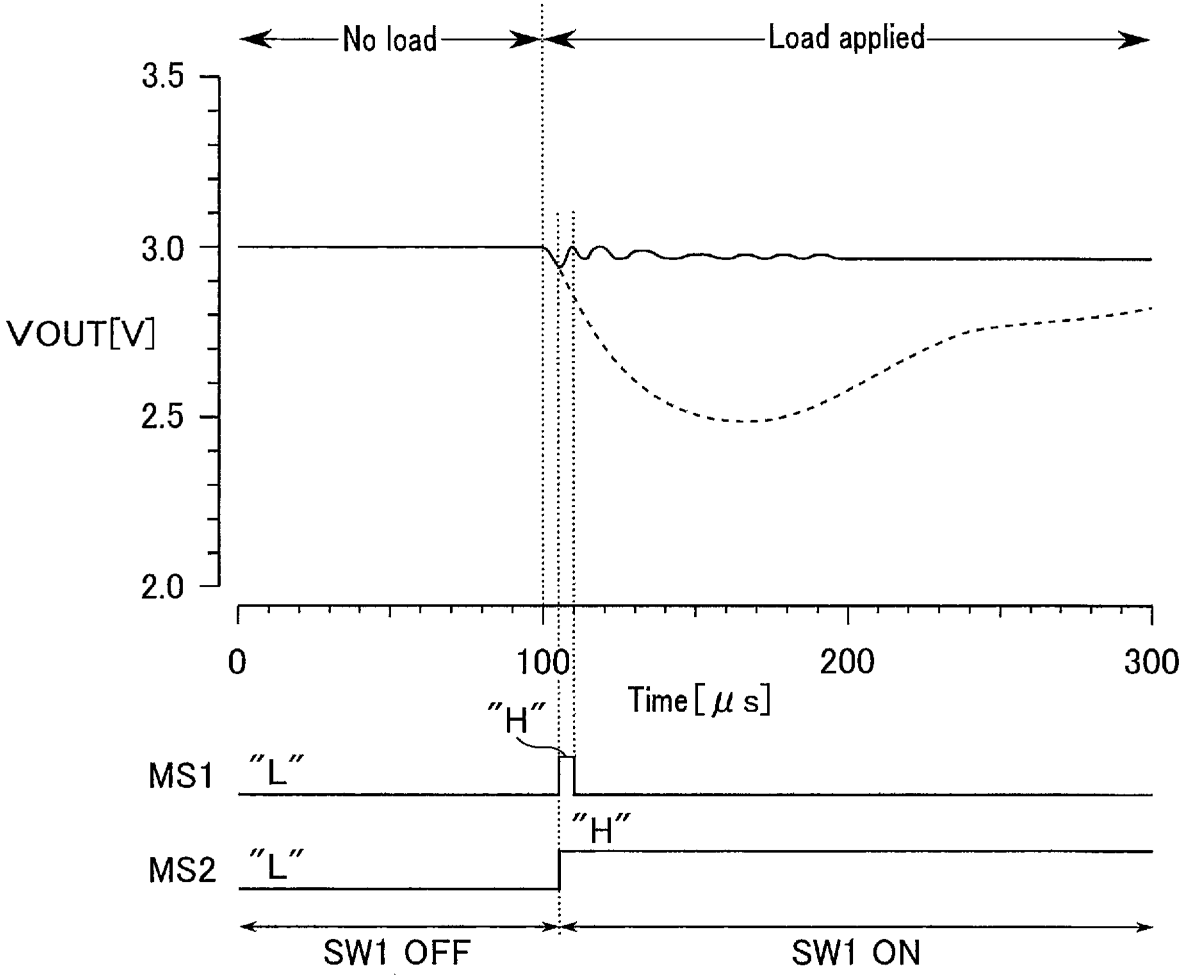
FIG. 9 is a diagram illustrating the advantageous effect of the constant voltage circuit according to the second embodiment.

According to the present embodiment, regardless of whether there is a fluctuation in output voltage or not, the high-speed response mode can be selected when the load current is raised. Hereinafter, this advantageous effect will be described with reference to FIG. 9. FIG. 9 is a diagram illustrating the advantageous effect of the constant voltage circuit 1 according to the present embodiment. FIG. 9 differs from FIG. 4 according to the first embodiment in terms of the mode signal MS2 and the operation of the switch circuit SW1.

As shown in FIG. 9, in the case of the constant voltage circuit 1 according to the present embodiment, when the output voltage VOUT drops at the time of 100 μs and the load current rises from, for example, 0 mA to 10 mA, at the time of 105 μs, the first voltage monitor circuit 30 sets the mode signal MS1 to the "H" level and the current monitor circuit 40 sets the mode signal MS2 to the "H" level. In this manner, the switch circuit SW1 is turned to the ON state, and the constant voltage circuit 1 transitions to the high-speed response mode. At the time of 110 has, the first voltage monitor circuit 30 restores the mode signal MS1 to the "L" level; however, the load current remains raised. Thus, the current monitor circuit 40 maintains the mode signal MS2 at the "H" level. In this manner, the switch circuit SW1 maintains the ON state, and the constant voltage circuit 1 maintains the high-speed response mode.

As described in the above, the constant voltage circuit 1 according to the present embodiment can select, regardless of whether there is a fluctuation in output voltage VOUT or not, the high-speed response mode when the load current is raised. As a matter of course, the present embodiment is applicable to the modification of the first embodiment.

3. Third Embodiment

The constant voltage circuit 1 according to a third embodiment will be described. The constant voltage circuit 1 according to the present embodiment differs from the first embodiment in terms of containing a second gain stage 50. Hereinafter, the following description will in principle concentrate on the features different from the first embodiment.

3.1 Circuit Configuration of Constant Voltage Circuit 1

Figure 10:
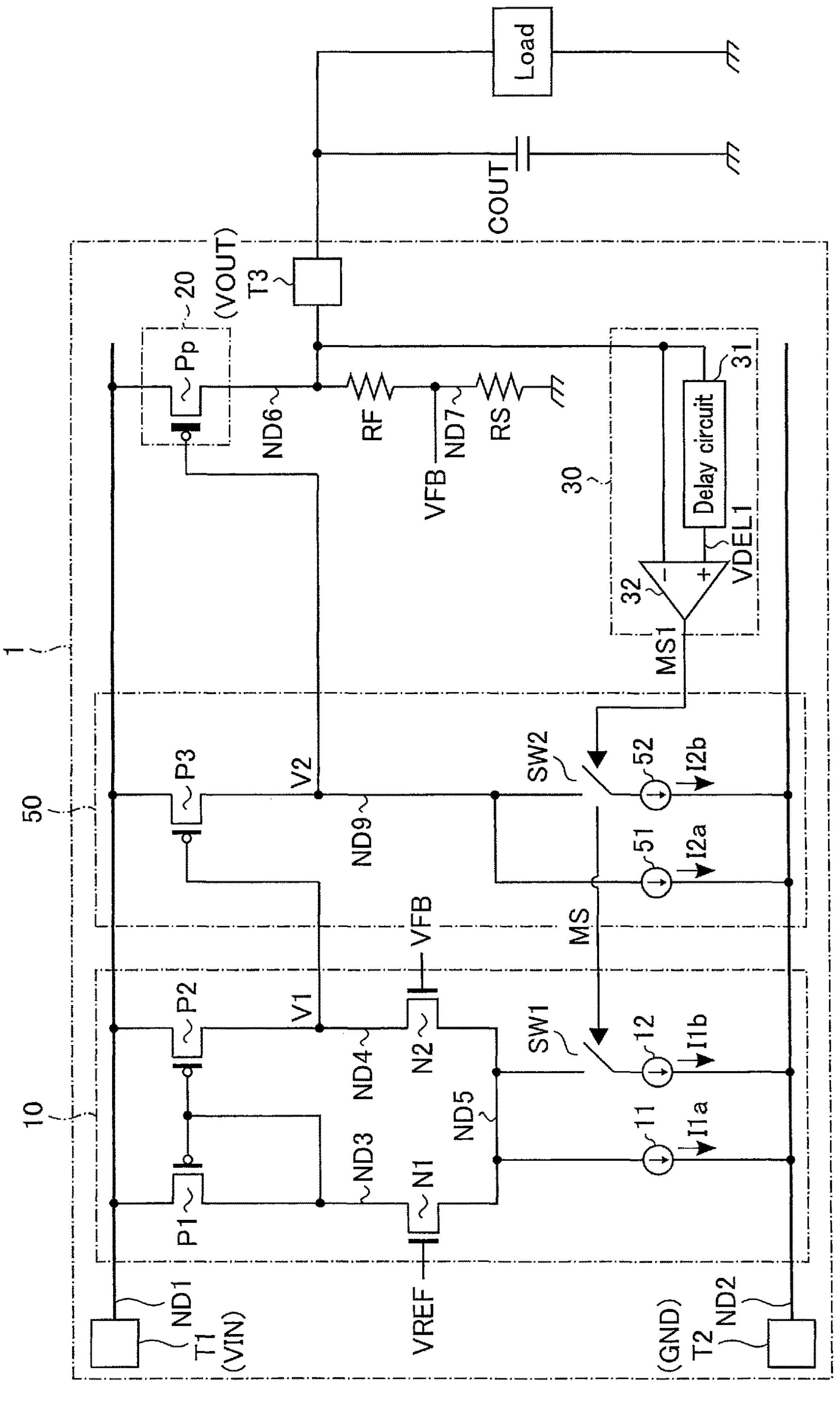
FIG. 10 is a circuit diagram showing an example of a constant voltage circuit according to a third embodiment.

A circuit configuration of the constant voltage circuit 1 according to the present embodiment will be described with reference to FIG. 10. FIG. 10 is a circuit diagram showing an example of the constant voltage circuit 1 according to the present embodiment.

The constant voltage circuit 1 further contains the second gain stage 50.

The constant voltage circuit 1 functions as an amplifier including the first gain stage 10, the second gain stage 50, and the output stage 20.

The second gain stage 50 amplifies the output voltage V1 of the first gain stage 10, thereby outputting the amplified output voltage V1 to the output stage 20. The second gain stage 50 contains a PMOS transistor P3, current sources 51 and 52, and the switch circuit SW2.

One end of the PMOS transistor P3 is coupled to the node ND1, and the other end is coupled to a node ND9. The node ND4 is coupled to a gate of the PMOS transistor P3. In other words, the output voltage V1 of the first gain stage 10 is applied to a gate of the PMOS transistor P3.

One end of the current source 51 is coupled to the node ND9, and the other end is coupled to the node ND2. A current I2a flows from the current source 51 to the node ND2.

One end of the switch circuit SW2 is coupled to the node ND9, and the other end is coupled to one end of the current source 52. The switch circuit SW2 operates based on the mode signal MS1 received from the first voltage monitor circuit 30. For example, the switch circuit SW2 is turned to the ON state in the case of the mode signal MS1 being at the "H" level, and is turned to the OFF state in the case of the mode signal MS1 being at the "L" level.

The other end of the current source 52 is coupled to the node ND2. The current I2b flows from the current source 52 to the node ND2. For example, the current I2b is a current greater than the current I2a. In the case of the low current consumption mode, the operation current I2a flows through the second gain stage 50. In the case of the high-speed response mode, an operation current (I2a+I2b) flows through the second gain stage 50. The operation current (I2a+I2b) is greater than the operation current I2a. Therefore, the high-speed response mode enables the output stage 20 in the subsequent stage to be driven at a higher speed than the low current consumption mode.

The node ND9 is coupled to the gate of the PMOS transistor Pp of the output stage 20. In other words, the output voltage V2 of the second gain stage 50 is applied to the gate of the PMOS transistor Pp.

The reference voltage VREF is applied to the gate of the NMOS transistor N1.

A voltage VFB is applied to the gate of the NMOS transistor N2.

The rest of the configuration of the constant voltage circuit 1 is similar to that of FIG. 1 according to the first embodiment.

3.2 Operation

The mode selection operation of the constant voltage circuit 1 according to the present embodiment will be described. The flowchart showing the mode selection operation of the constant voltage circuit 1 according to the present embodiment differs from that of FIG. 3 according to the first embodiment in that the operation of the switch circuit SW2 is added. Hereinafter, the mode selection operation of the constant voltage circuit 1 will be described with reference to FIG. 3.

In S13 shown in FIG. 3, upon receipt of the mode signal MS1 at the "H" level, the switch circuits SW1 and SW2 are turned to the ON state.

In S17 shown in FIG. 3, upon receipt of the mode signal MS1 at the "L" level, the switch circuits SW1 and SW2 are turned to the OFF state.

The rest of the mode selection operation is similar to that of FIG. 3 according to the first embodiment.

3.3 Advantageous Effect

The configuration according to the present embodiment produces an advantageous effect similar to that of the first embodiment. As a matter of course, the present embodiment is applicable to the modification of the first embodiment.

3.4 Modification

The constant voltage circuit 1 according to the modification of the third embodiment will be described. The constant voltage circuit 1 according to the present modification differs from the third embodiment in terms of containing the current monitor circuit 40. Hereinafter, the following description will in principle concentrate on the features different from the third embodiment.

3.4.1 Circuit Configuration of Constant Voltage Circuit 1

Figure 11:
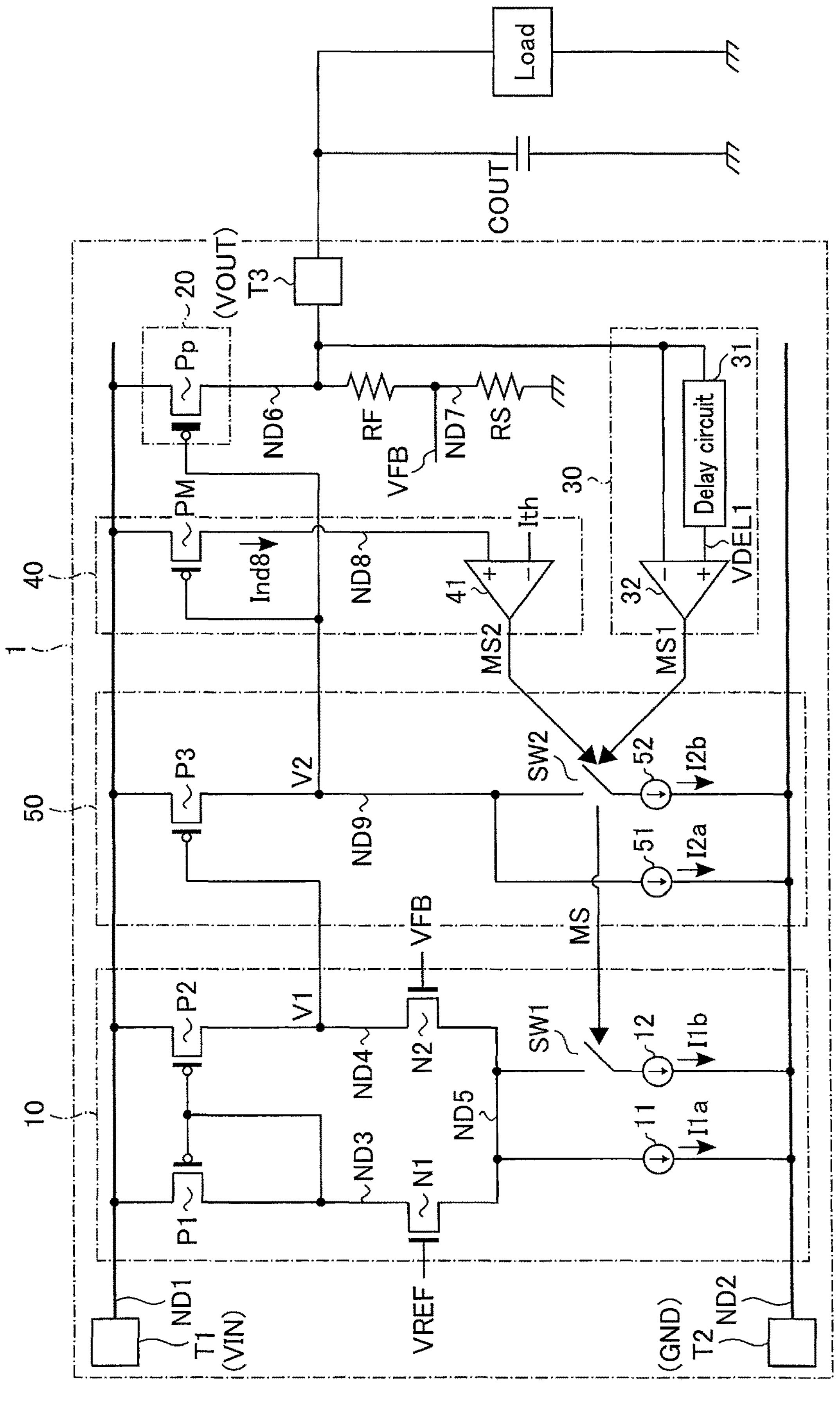
FIG. 11 is a circuit diagram showing an example of a constant voltage circuit according to a modification of the third embodiment.

A circuit configuration of the constant voltage circuit 1 according to the present modification will be described with reference to FIG. 11. FIG. 11 is a circuit diagram showing an example of the constant voltage circuit 1 according to the present modification.

The constant voltage circuit 1 further contains the current monitor circuit 40.

The current monitor circuit 40 differs from that of FIG. 6 according to the second embodiment in terms of coupling of the PMOS transistor PM. In the example shown in FIG. 11, one end of the PMOS transistor PM is coupled to the node ND1, and the other end is coupled to the node ND8. The node ND9 is coupled to the gate of the PMOS transistor PM. In other words, the output voltage V2 of the second gain stage 50 is applied to the gate of the PMOS transistor PM as with the PMOS transistor Pp. The rest of the configuration of the current monitor circuit 40 is similar to that of FIG. 6 according to the second embodiment.

The rest of the configuration of the constant voltage circuit 1 is similar to that of FIG. 10 according to the third embodiment.

3.4.2 Mode Selection Operation

The mode selection operation of the constant voltage circuit 1 according to the present modification will be described. The flowchart showing the mode selection operation of the constant voltage circuit 1 according to the present modification differs from that of FIG. 7 and FIG. 8 according to the second embodiment in that the operation of the switch circuit SW2 is added. Hereinafter, the mode selection operation of the constant voltage circuit 1 will be described with reference to FIG. 7 and FIG. 8.

In S13 shown in FIG. 7, the switch circuits SW1 and SW2 are turned to the ON state based on the mode signals MS1 and MS2.

In S17 shown in FIG. 8, the switch circuit SW1 and SW2 are turned to the OFF state based on the mode signals MS1 and MS2.

The rest of the mode selection operation is similar to that of FIG. 7 and FIG. 8 according to the second embodiment.

3.4.3 Advantageous Effect

The configuration according to the present modification produces an advantageous effect similar to those of the second and third embodiments. As a matter of course, the present modification is applicable to the modification of the first embodiment.

4. Fourth Embodiment

The constant voltage circuit 1 according to a fourth embodiment will be described. The constant voltage circuit 1 according to the present embodiment differs from the first embodiment in terms of containing a second voltage monitor circuit 60. Hereinafter, the following description will in principle concentrate on the features different from the first embodiment.

4.1 Circuit Configuration of Constant Voltage Circuit 1

Figure 12:
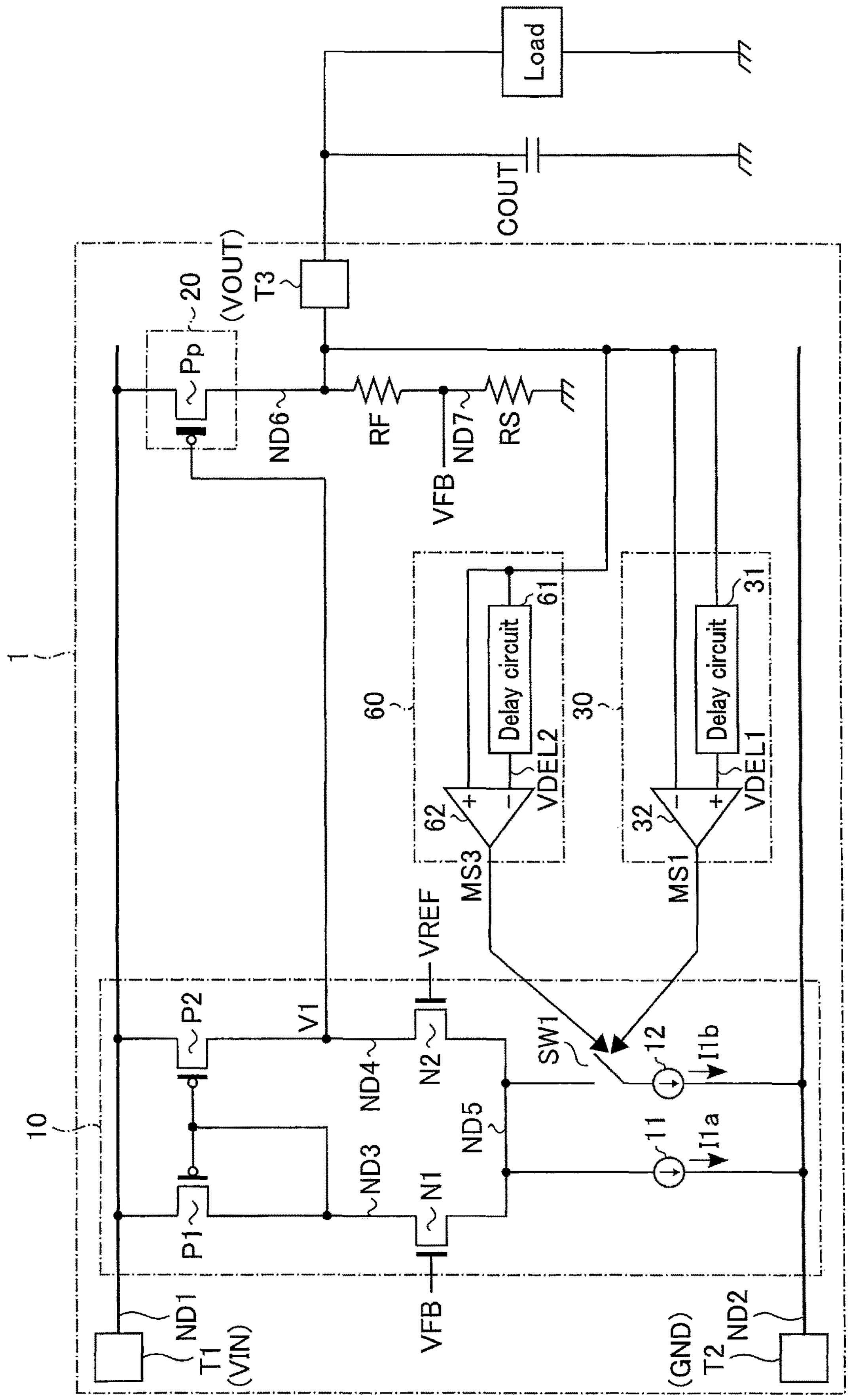
FIG. 12 is a circuit diagram showing an example of a constant voltage circuit according to a fourth embodiment.

A circuit configuration of the constant voltage circuit 1 according to the present embodiment will be described with reference to FIG. 12. FIG. 12 is a circuit diagram showing an example of the constant voltage circuit 1 according to the present embodiment.

The constant voltage circuit 1 further contains the second voltage monitor circuit 60.

The second voltage monitor circuit 60 contains a delay circuit 61 and a comparator 62.

The delay circuit 61 is coupled to the output voltage terminal T3 and an inversion input terminal of the comparator 62. The output voltage VOUT is applied from the output voltage terminal T3 to the delay circuit 61. The delay circuit 61 delays an output timing of the output voltage VOUT, and outputs the output voltage VOUT as a voltage VDEL2 at the delayed output timing to the inversion input terminal of the comparator 62. The configuration of the delay circuit 61 is similar to that of the delay circuit 31.

A non-inversion input terminal of the comparator 62 is coupled to the output voltage terminal T3. The output voltage VOUT is applied from the output voltage terminal T3 to the non-inversion input terminal of the comparator 62. The voltage VDEL2 is applied from the delay circuit 61 to the inversion input terminal of the comparator 62. A mode signal MS3 is output from an output terminal of the comparator 62. For example, in the case where the voltage VOUT rises, the voltage VDEL2 thereafter rises at a timing delayed by the delay circuit 61. This causes a potential difference between the voltage VOUT and the voltage VDEL2. During a period in which the voltage VOUT is greater than the voltage VDEL2, the comparator 62 outputs the mode signal MS3 at the "H" level. On the other hand, during a period in which the voltage VOUT is smaller than or equal to the voltage VDEL2, the comparator 62 outputs the mode signal MS3 at the "L" level.

The switch circuit SW1 operates based on the mode signal MS1 received from the first voltage monitor circuit 30 and the mode signal MS3 received from the second voltage monitor circuit 60. For example, the switch circuit SW1 is turned to the ON state in the case where at least one of the mode signals MS1 and MS3 is at the "H" level. In this manner, the high-speed response mode is selected. The switch circuit SW1 is turned to the OFF state in the case where both of the mode signals MS1 and MS3 are at the "L" level. In this manner, the low current consumption mode is selected. That is, the switch circuit SW1 is turned to the ON state or the OFF state based on a result of an OR operation on the mode signal MS1 and the mode signal MS3.

The rest of the configuration of the constant voltage circuit 1 is similar to that of FIG. 1 according to the first embodiment.

4.2 Mode Selection Operation

Figure 13:
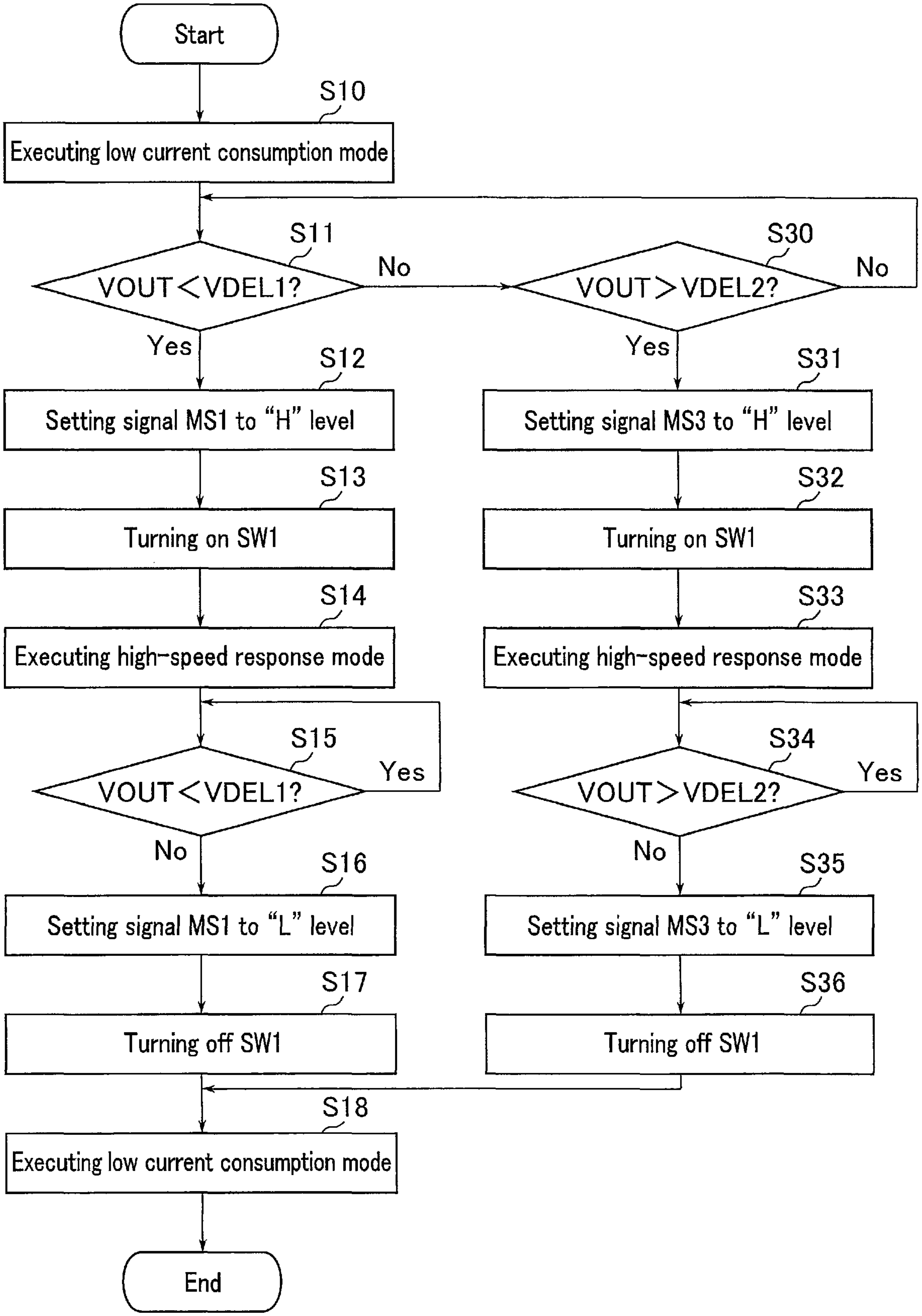
FIG. 13 is a flowchart showing a mode selection operation of the constant voltage circuit according to the fourth embodiment.

A mode selection operation of the constant voltage circuit 1 according to a present embodiment will be described with reference to FIG. 13. FIG. 13 is a flowchart showing the mode selection operation of the constant voltage circuit 1 according to the present embodiment. The operation from S30 to S36 is added to the operation from S10 to S18 in FIG. 3 according to the first embodiment. The operation from S10 to S18 is similar to that shown in FIG. 3 according to the first embodiment. Hereinafter, the following description will in principle concentrate on the operation from S30 to S36 (operation performed in the case where the output voltage VOUT is greater than or equal to the voltage VDEL1 (S11_No)).

After the execution of to S10, the mode signals MS1 and MS3 are at the "L" level.

In the case of the output voltage VOUT being smaller than or equal to the voltage VDEL2 (S30_No), the second voltage monitor circuit 60 maintains the mode signal MS3 at the "L" level.

On the other hand, in the case of the output voltage VOUT being greater than the voltage VDEL2 (S30_Yes), the second voltage monitor circuit 60 sets the mode signal MS3 to the "H" level (S31). In other words, the comparator 62 outputs the voltage at the "H" level during a period in which in the comparator 62, the voltage VOUT of the non-inversion input terminal is greater than the voltage VDEL2 of the inversion input terminal.

Upon receipt of the mode signal MS1 at the "L" level and the mode signal MS3 at the "H" level, the switch circuit SW1 is turned to the ON state (S32). As a result, the constant voltage circuit 1 executes the high-speed response mode (S33).

In the case of the output voltage VOUT being greater than the voltage VDEL2 (S34_Yes), the second voltage monitor circuit 60 maintains the mode signal MS3 at the "H" level.

On the other hand, in the case of the output voltage VOUT being smaller than or equal to the voltage VDEL2 (S34_No), the second voltage monitor circuit 60 sets the mode signal MS3 to the "L" level (S35). In other words, the comparator 62 outputs the voltage at the "L" level during a period in which in the comparator 62, the voltage VOUT of the non-inversion input terminal is smaller than or equal to the voltage VDEL2 of the inversion input terminal.

Upon receipt of the mode signal MS1 at the "L" level and the mode signal MS3 at the "L" level, the switch circuit SW1 is turned to the OFF state (S36). As a result, the constant voltage circuit 1 executes the low current consumption mode (S18).

4.3 Advantageous Effect

The configuration according to the present embodiment produces an advantageous effect similar to that of the first embodiment.

In the case of the constant voltage circuit 1 according to the present embodiment, when the output voltage VOUT rises, the second voltage monitor circuit 60 sets the mode signal MS3 to the "H" level. In this manner, the switch circuit SW1 is turned to the ON state, and the constant voltage circuit 1 executes the high-speed response mode.

As described in the above, the constant voltage circuit 1 according to the present embodiment can realize a high-speed response not only in the case where the output voltage VOUT is dropped but also in the case where the output voltage VOUT is raised. As a matter of course, the present embodiment is applicable to the modification of the first embodiment. In this case, a voltage source of the offset circuit in the second voltage monitor circuit 60 is a negative voltage. The present embodiment is also applicable to the second and third embodiments and the modification of the third embodiment.

5. Fifth Embodiment

The constant voltage circuit 1 according to a fifth embodiment will be described. The constant voltage circuit 1 according to the present embodiment differs from the first embodiment in terms of containing an ON period extension circuit 70. The flowchart showing the mode selection operation is similar to that of FIG. 3 according to the first embodiment. Hereinafter, the following description will in principle concentrate on the features different from the first embodiment.

5.1 Circuit Configuration of Constant Voltage Circuit 1

Figure 14:
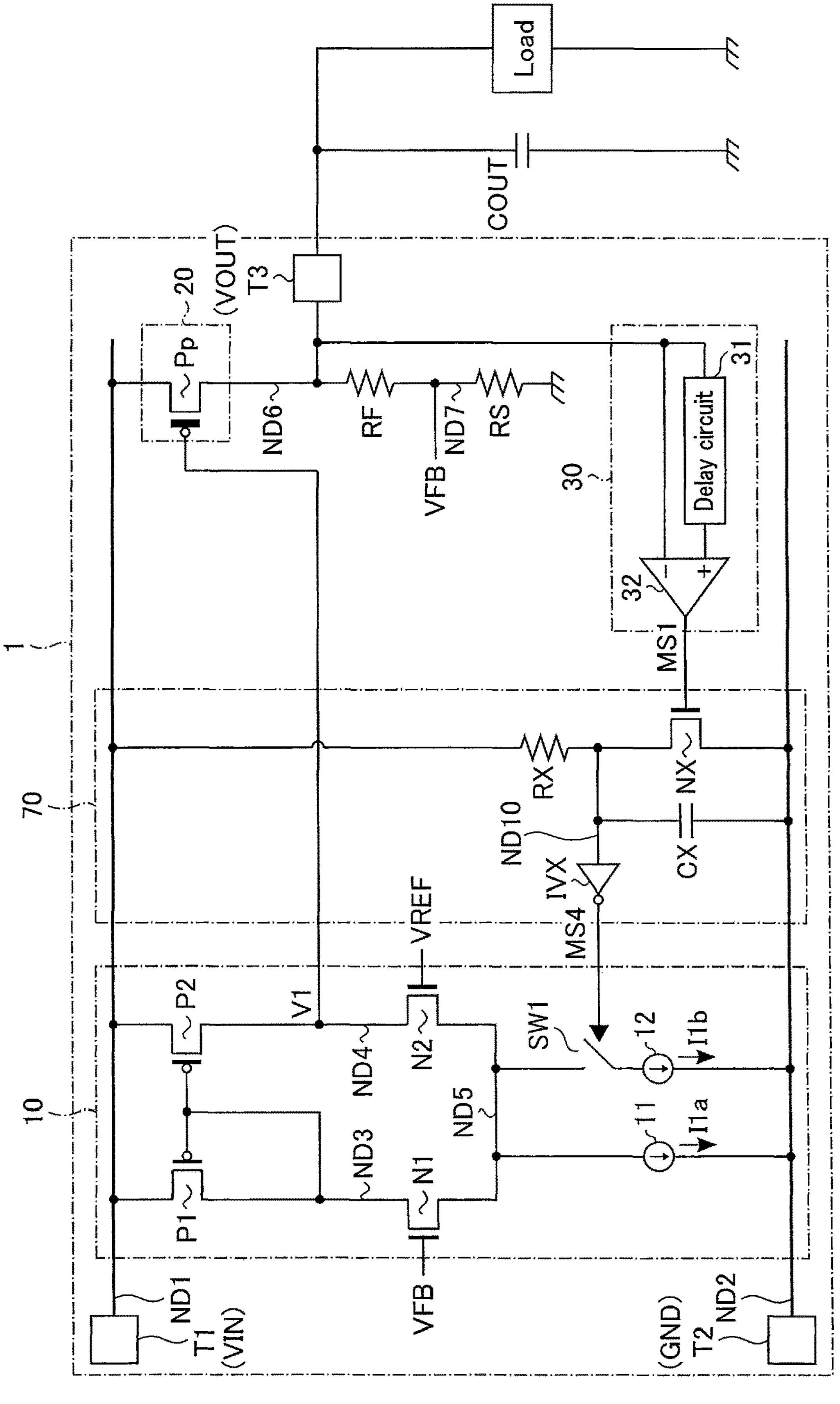
FIG. 14 is a circuit diagram showing an example of a constant voltage circuit according to a fifth embodiment.

A circuit configuration of the constant voltage circuit 1 according to the present embodiment will be described with reference to FIG. 14. FIG. 14 is a circuit diagram showing an example of the constant voltage circuit 1 according to the present embodiment.

The constant voltage circuit 1 further contains the ON period extension circuit 70.

The ON period extension circuit 70 contains a resistance element RX, an NMOS transistor NX, a capacitance element CX, and an inverter circuit IVX.

One end of the resistance element RX is coupled to the node ND1, and the other end is coupled to a node ND10.

One end of the NMOS transistor NX is coupled to the node ND10, and the other end is coupled to the node ND2.

The output terminal of the comparator 32 is coupled to a gate of the NMOS transistor NX.

One end of the capacitance element CX is coupled to the node ND10, and the other end is grounded (coupled to the ground voltage interconnect).

An input terminal of the inverter circuit IVX is coupled to the node ND10. A mode signal MS4 is output from an output terminal of the inverter circuit IVX.

For example, in the case where the output voltage VOUT drops, the comparator 32 outputs the mode signal MS1 at the "H" level. This sets the gate of the NMOS transistor NX to the "H" level, thereby turning the NMOS transistor NX to the ON state. When the NMOS transistor NX is turned to the ON state, a drain of the NMOS transistor NX immediately transitions to the "L" level. The inverter circuit IVX outputs, as the mode signal MS4, the voltage at the "H" level obtained by inverting a logic level of the drain of the NMOS transistor NX. This turns the switch circuit SW1 to the ON state. During a period in which the voltage VOUT is smaller than the voltage VDEL1, the comparator 32 outputs the mode signal MS1 at the "H" level, and the inverter circuit IVX outputs the mode signal MS4 at the "H" level.

In the case where the output voltage VOUT is greater than or equal to the voltage VDEL1, that is, in the case where the output voltage VOUT is restored to a steady state, the comparator 32 outputs the mode signal MS1 at the "L" level. This sets the gate of the NMOS transistor NX to the "L" level, thereby turning the NMOS transistor NX to the OFF state. When the NMOS transistor NX is turned to the OFF state, the drain of the NMOS transistor NX slowly rises. This is because a current that charges the drain of the NMOS transistor NX and the capacitance element CX is controlled by the resistance element RX. After a certain period of time (for example, 100 microseconds) has elapsed, the drain of the NMOS transistor NX transitions to the "H" level. The inverter circuit IVX outputs, as the mode signal MS4, the voltage at the "L" level obtained by inverting a logic level of the drain of the NMOS transistor NX. This turns the switch circuit SW1 to the OFF state. When the voltage VOUT is restored to the voltage VDEL1 or greater, the comparator 32 outputs the mode signal MS1 at the "L" level, and the inverter circuit IVX outputs the mode signal MS4 at the "L" level after a certain period of time has elapsed. That is, the mode signal MS4 is a signal obtained by delaying a timing at which the mode signal MS1 transitions from the "H" level to the "L" level.

The rest of the configuration of the constant voltage circuit 1 is similar to that of FIG. 1 according to the first embodiment.

5.2 Advantageous Effect

The configuration according to the present embodiment produces an advantageous effect similar to that of the first embodiment.

In the case of the constant voltage circuit 1 according to the present embodiment, when the constant voltage circuit 1 is restored to the low current consumption mode after the output voltage VOUT is restored to the steady state, the ON period extension circuit 70 extends a period in which the switch circuit SW1 is in the ON state, by a certain period of time. Thereafter, the switch circuit SW1 is turned to the OFF state. This can prevent complications in switching between ON and OFF of the switch circuit SW1. Thus, the stability of the constant voltage circuit 1 can be improved. As a matter of course, the present embodiment is applicable to the modification of the first embodiment, the second and third embodiments, the modification of the third embodiment, and the fourth embodiment.

6. Sixth Embodiment

The constant voltage circuit 1 according to a sixth embodiment will be described. The constant voltage circuit 1 according to the present embodiment differs from the third embodiment in that a PMOS transistor is used for the input terminal of the first gain stage 10 and an NMOS transistor is used for the input terminal of the second gain stage 50. The flowchart showing the mode selection operation is similar to that of the third embodiment. Hereinafter, the following description will in principle concentrate on the features different from the third embodiment.

6.1 Circuit Configuration of Constant Voltage Circuit 1

Figure 15:
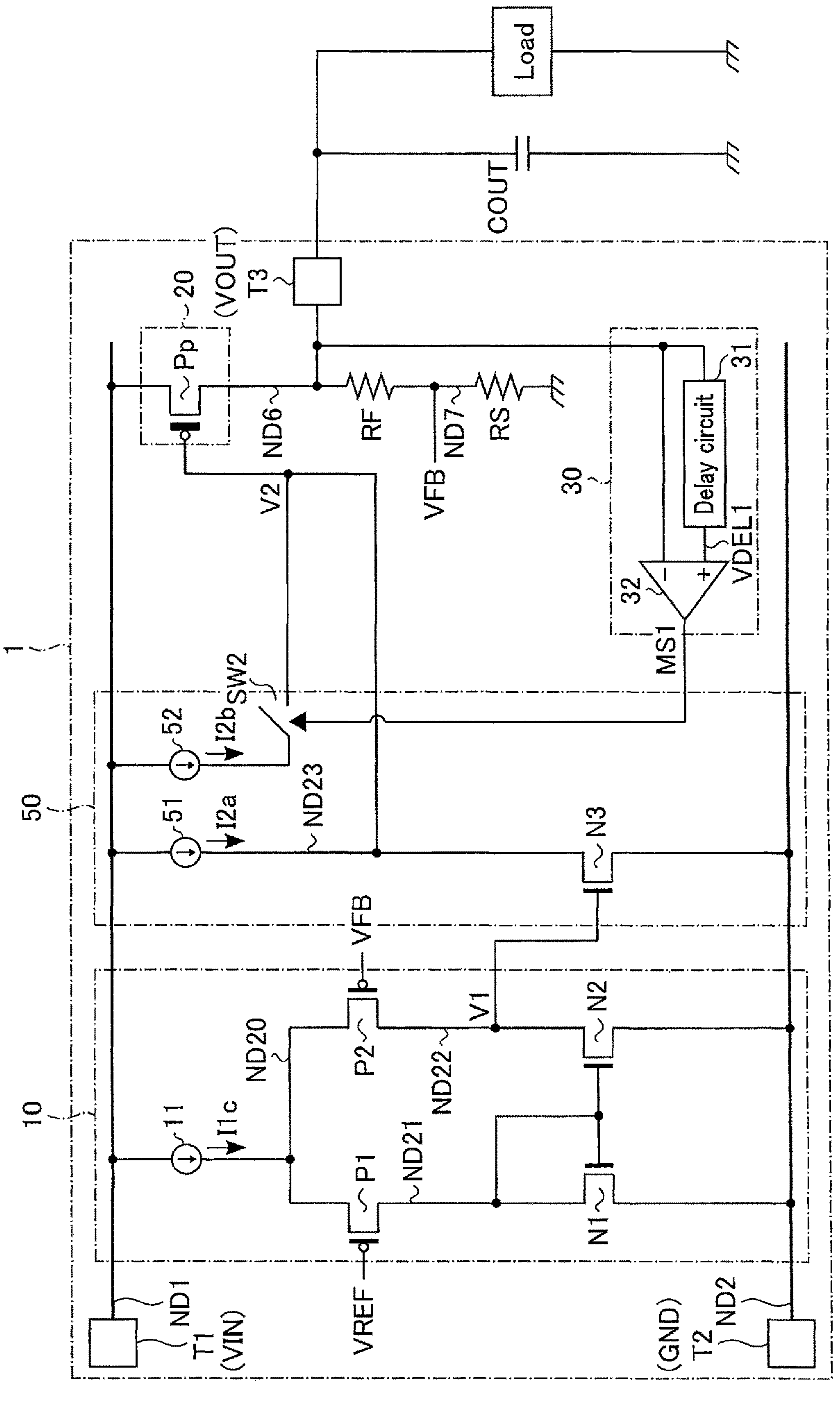
FIG. 15 is a circuit diagram showing an example of a constant voltage circuit according to a sixth embodiment.

A circuit configuration of the constant voltage circuit 1 according to the present embodiment will be described with reference to FIG. 15. FIG. 15 is a circuit diagram showing an example of the constant voltage circuit 1 according to the present embodiment.

The first gain stage 10 contains the PMOS transistors P1 and P2, the NMOS transistors N1 and N2, and the current source 11.

One end of the current source 11 is coupled to the node ND1, and the other end is coupled to a node ND20. The current I1c flows from the current source 11 to the node ND20.

One end of the PMOS transistor P1 is coupled to the node ND20, and the other end is coupled to a node ND21. The reference voltage VREF is applied to the gate of the PMOS transistor P1.

One end of the PMOS transistor P2 is coupled to the node ND20, and the other end is coupled to a node ND22. The voltage VFB is applied to the gate of the PMOS transistor P2.

One end and the gate of the NMOS transistor N1 are coupled to the node ND21, and the other end is coupled to the node ND2.

One end of the NMOS transistor N2 is coupled to the node ND22, the other end is coupled to the node ND2, and the gate is coupled to the node ND21. The NMOS transistors N1 and N2 form a current mirror.

The second gain stage 50 contains an NMOS transistor N3, the current sources 51 and 52, and the switch circuit SW2.

One end of the current source 51 is coupled to the node ND1, and the other end is coupled to a node ND23. The current I2a flows from the current source 51 to the node ND23.

One end of the current source 52 is coupled to the node ND1, and the other end is coupled to one end of the switch circuit SW2. The current I2b flows from the current source 52 to the switch circuit SW2.

The other end of the switch circuit SW2 is coupled to the node ND23. The switch circuit SW2 operates based on the mode signal MS1 received from the first voltage monitor circuit 30. For example, the switch circuit SW2 is turned to the ON state in the case of the mode signal MS1 being at the "H" level, and is turned to the OFF state in the case of the mode signal MS1 being at the "L" level.

One end of the NMOS transistor N3 is coupled to the node ND23, and the other end is coupled to the node ND2. The node ND22 is coupled to a gate of the NMOS transistor N3. In other words, the output voltage V1 of the first gain stage 10 is applied to the gate of the NMOS transistor N3.

The node ND23 is coupled to the gate of the PMOS transistor Pp of the output stage 20. In other words, the output voltage V2 of the second gain stage 50 is applied to the gate of the PMOS transistor Pp.

The rest of the configuration of the constant voltage circuit 1 is similar to that of FIG. 10 according to the third embodiment.

6.2 Advantageous Effect

The configuration according to the present embodiment produces an advantageous effect similar to that of the third embodiment. As a matter of course, the present embodiment is applicable to the modification of the first embodiment, the second embodiment, and the fourth and fifth embodiments.

7. Modifications, etc.

As described in the above, a constant voltage circuit (1) according to the embodiments includes a first gain stage (10) configured to output a first voltage (V1) obtained by amplifying a difference between a reference voltage (VREF) and a divided voltage (VFB) obtained by dividing an output voltage (VOUT); a first transistor (Pp) including a first end, a second end, and a gate, the first end being coupled to an input voltage terminal (T1), the second end being coupled to an output voltage terminal (T3), the first transistor being configured to control the output voltage (VOUT) based on the first voltage (V1) applied to the gate; and a second circuit (30) containing a first circuit (31) configured to output a second voltage (VDEL1) obtained by delaying an output timing of the output voltage (VOUT), the second circuit being configured to control a first signal (MS1) based on a voltage difference between the second voltage and a third voltage (VOUT/VOUT') that is based on the output voltage. In a case of the first signal (MS1) being at a first logic level (L), a first operation mode (low current consumption mode) is selected so that a first current (I1a) flows through the first gain stage (10), and in a case of the first signal being at a second logic level (H), a second operation mode (high-speed response mode) is selected so that a second current (I1a+I1b) greater than the first current flows through the first gain stage.

The embodiments are not limited to those described in the above, and various modifications can be made.

The order of the steps in the above-described flowchart may be altered in any manner possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A constant voltage circuit comprising:

a first gain stage configured to output a first voltage obtained by amplifying a difference between a reference voltage and a divided voltage obtained by dividing an output voltage;

a first transistor including a first end, a second end, and a gate, the first end being coupled to an input voltage terminal, the second end being coupled to an output voltage terminal, the first transistor being configured to control the output voltage based on the first voltage applied to the gate;

a second circuit containing a first circuit configured to output a second voltage obtained by delaying an output timing of the output voltage, the second circuit being configured to control a first signal based on a voltage difference between the second voltage and a third voltage that is based on the output voltage; and a third circuit configured to control a second signal based on a current difference between a threshold current and a third current corresponding to a current flowing through the first transistor, wherein in a case of the first signal and the second signal being at a first logic level, a first operation mode is selected so that a first current flows through the first gain stage, and in a case of at least one of the first signal or the second signal being at a second logic level, a second operation mode is selected so that a second current greater than the first current flows through the first gain stage.

2. The constant voltage circuit according to claim 1, wherein in a case of the third voltage being greater than or equal to the second voltage, the second circuit sets the first signal to the first logic level, in a case of the third voltage being smaller than the second voltage, the second circuit sets the first signal to the second logic level, in a case of the third current being smaller than or equal to the threshold current, the third circuit sets the second signal to the first logic level, and in a case of the third current being greater than the threshold current, the third circuit sets the second signal to the second logic level.

3. A constant voltage circuit comprising:

a first gain stage configured to output a first voltage obtained by amplifying a difference between a reference voltage and a divided voltage obtained by dividing an output voltage;

a first transistor including a first end, a second end, and a gate, the first end being coupled to an input voltage terminal, the second end being coupled to an output voltage terminal, the first transistor being configured to control the output voltage based on the first voltage applied to the gate;

a second circuit containing a first circuit configured to output a second voltage obtained by delaying an output timing of the output voltage, the second circuit being configured to control a first signal based on a voltage difference between the second voltage and a third voltage that is based on the output voltage; and a third circuit containing a fourth circuit configured to output a fourth voltage obtained by delaying an output timing of the output voltage, the third circuit being configured to control a third signal based on a voltage difference between the fourth voltage and a fifth voltage that is based on the output voltage, wherein in a case of the first signal and the third signal being at a first logic level, a first operation mode is selected so that a first current flows through the first gain stage, and in a case of at least one of the first signal or the third signal being at a second logic level, a second operation mode is selected so that a second current greater than the first current flows through the first gain stage.

4. The constant voltage circuit according to claim 3, wherein in a case of the third voltage being greater than or equal to the second voltage, the second circuit sets the first signal to the first logic level, in a case of the third voltage being smaller than the second voltage, the second circuit sets the first signal to the second logic level, in a case of the fifth voltage being smaller than or equal to the fourth voltage, the third circuit sets the third signal to the first logic level, and in a case of the fifth voltage being greater than the fourth voltage, the third circuit sets the third signal to the second logic level.

5. A constant voltage circuit comprising:

a first gain stage configured to output a first voltage obtained by amplifying a difference between a reference voltage and a divided voltage obtained by dividing an output voltage;

a first transistor including a first end, a second end, and a gate, the first end being coupled to an input voltage terminal, the second end being coupled to an output voltage terminal, the first transistor being configured to control the output voltage based on the first voltage applied to the gate;

a second circuit containing a first circuit configured to output a second voltage obtained by delaying an output timing of the output voltage, the second circuit being configured to control a first signal based on a voltage difference between the second voltage and a third voltage that is based on the output voltage; and a third circuit configured to generate a fourth signal obtained by delaying a timing at which the first signal transitions from a second logic level to a first logic level, wherein in a case of the first signal being at the first logic level, a first operation mode is selected so that a first current flows through the first gain stage, and in a case of the first signal being at the second logic level, a second operation mode is selected so that a second current greater than the first current flows through the first gain stage.

6. The constant voltage circuit according to claim 3, wherein the third voltage is equal to the output voltage and the fifth voltage is equal to the output voltage.

7. The constant voltage circuit according to claim 3, wherein the third voltage is greater than the output voltage and the fifth voltage is smaller than the output voltage.

8. A constant voltage circuit comprising:

a first gain stage configured to output a first voltage obtained by amplifying a difference between a reference voltage and a divided voltage obtained by dividing an output voltage;

a second gain stage configured to output a second voltage obtained by amplifying the first voltage;

a first transistor containing a first end, a second end, and a gate, the first end being coupled to an input voltage terminal, the second end being coupled to an output voltage terminal, the first transistor being configured to control the output voltage based on the second voltage applied to the gate;

a second circuit containing a first circuit configured to output a third voltage obtained by delaying an output timing of the output voltage, the second circuit being configured to control a first signal based on a voltage difference between the third voltage and a fourth voltage that is based on the output voltage; and a third circuit configured to control a second signal based on a current difference between a threshold current and a third current corresponding to a current flowing through the first transistor, wherein in a case of the first signal and the second signal being at a first logic level, a first operation mode is selected so that a first current flows through the first gain stage, and in a case of at least one of the first signal or the second signal being at a second logic level, a second operation mode is selected so that a second current greater than the first current flows through the first gain stage.

9. The constant voltage circuit according to claim 8, wherein in a case of the fourth voltage being greater than or equal to the third voltage, the second circuit sets the first signal to the first logic level, in a case of the fourth voltage being smaller than the third voltage, the second circuit sets the first signal to the second logic level, in a case of the third current being smaller than or equal to the threshold current, the third circuit sets the second signal to the first logic level, and in a case of the third current being greater than the threshold current, the third circuit sets the second signal to the second logic level.

10. The constant voltage circuit according to claim 8, wherein the fourth voltage is equal to the output voltage.

11. The constant voltage circuit according to claim 8, wherein the fourth voltage is greater than the output voltage.

* * * * *